(12) United States Patent
Hayashida

(10) Patent No.: US 7,164,137 B2
(45) Date of Patent: Jan. 16, 2007

(54) CASSETTE TYPE RADIOGRAPHIC APPARATUS

(75) Inventor: Shinsuke Hayashida, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/203,494

(22) Filed: Aug. 12, 2005

(65) Prior Publication Data

US 2006/0038132 A1    Feb. 23, 2006

(30) Foreign Application Priority Data

Aug. 19, 2004    (JP)    ............... 2004-239794

(51) Int. Cl.
*G01T 1/20* (2006.01)
*G01T 1/24* (2006.01)

(52) U.S. Cl. .............................. 250/370.11
(58) Field of Classification Search ........... 250/370.11
See application file for complete search history.

(56) References Cited

U.S. PATENT DOCUMENTS

| | | | | |
|---|---|---|---|---|
| 3,971,470 A | * | 7/1976 | White | ............... 206/455 |
| 6,700,126 B1 | * | 3/2004 | Watanabe | ............... 250/370.09 |
| 6,734,441 B1 | * | 5/2004 | Wendlandt | ............... 250/485.1 |
| 2002/0005490 A1 | * | 1/2002 | Watanabe | ............... 250/370.09 |
| 2003/0010932 A1 | * | 1/2003 | Wendlandt et al. | ............... 250/484.4 |
| 2003/0025084 A1 | * | 2/2003 | Honda et al. | ............... 250/370.11 |
| 2003/0098423 A1 | * | 5/2003 | Wendlandt | ............... 250/484.4 |

FOREIGN PATENT DOCUMENTS

| | | | |
|---|---|---|---|
| GB | 2057628 A | * | 4/1981 |
| JP | 2002-186604 | | 7/2002 |
| JP | 2003-057352 | | 2/2003 |

* cited by examiner

*Primary Examiner*—David Porta
*Assistant Examiner*—Mark R. Gaworecki
(74) *Attorney, Agent, or Firm*—Cowan, Liebowitz & Latman, P.C.

(57) ABSTRACT

A radiographic apparatus includes a columnar crystal phosphor which converts X-rays into visible light, a photodetector which converts the visible light into an electrical signal, and a case (a case lid and case main body) which houses the columnar crystal phosphor and photodetector. A buffer member which buffers a force from outside the case (the case lid and case main body) and a highly rigid member which has higher rigidity than that of the columnar crystal phosphor are arranged between the case (the case lid and case main body) and columnar crystal phosphor.

11 Claims, 18 Drawing Sheets

FIG. 8

LAYER ARRANGEMENTS OF COLUMNAR CRYSTAL PHOSPHORS IN RESPECTIVE EMBODIMENTS

| | COLUMNAR CRYSTAL PHOSPHOR | DEPOSITION SUBSTRATE | GAP | | BUFFER MEMBER | GAP | CASE COVER |
|---|---|---|---|---|---|---|---|
| FIRST EMBODIMENT | CsI (INDIRECT DEPOSITION) | HIGHLY RIGID MEMBER | GAP | HIGHLY RIGID MEMBER | BUFFER MEMBER | GAP | ORDINARY COVER |
| SECOND EMBODIMENT | CsI (DIRECT DEPOSITION) | SEMICONDUCTOR PHOTOELECTRIC CONVERSION SENSOR | GAP | HIGHLY RIGID MEMBER (INCLUDING SIDE SURFACES) | BUFFER MEMBER | GAP | ORDINARY COVER |
| THIRD EMBODIMENT | CsI (INDIRECT DEPOSITION) | HIGHLY RIGID MEMBER | GAP | HIGHLY RIGID MEMBER (INCLUDING SIDE SURFACES) | BUFFER MEMBER | GAP | ORDINARY COVER |
| FOURTH EMBODIMENT | CsI (DIRECT DEPOSITION) | SEMICONDUCTOR PHOTOELECTRIC CONVERSION SENSOR | GAP | HIGHLY RIGID MEMBER | BUFFER MEMBER | GAP | ORDINARY COVER |
| FIFTH EMBODIMENT | CsI (INDIRECT DEPOSITION) | HIGHLY RIGID MEMBER | GAP | HIGHLY RIGID PORTION (DIRECTLY DEPOSITED ON HIGHLY RIGID MEMBER) | BUFFER MEMBER | GAP | ORDINARY COVER |
| SIXTH EMBODIMENT | CsI (DIRECT DEPOSITION) | SEMICONDUCTOR PHOTOELECTRIC CONVERSION SENSOR | GAP | HIGHLY RIGID MEMBER (INCLUDING SIDE SURFACES) | BUFFER MEMBER | GAP | HIGHLY RIGID MEMBER |
| SEVENTH EMBODIMENT | CsI (INDIRECT DEPOSITION) | HIGHLY RIGID MEMBER | GAP | HIGHLY RIGID MEMBER (INCLUDING SIDE SURFACES) | BUFFER MEMBER | GAP | HIGHLY RIGID MEMBER |

[IMAGE OF CsI AFTER FRACTURE BY EXTERNAL PRESSURE]

ENLARGED IMAGE OF HITTING MARK PORTION

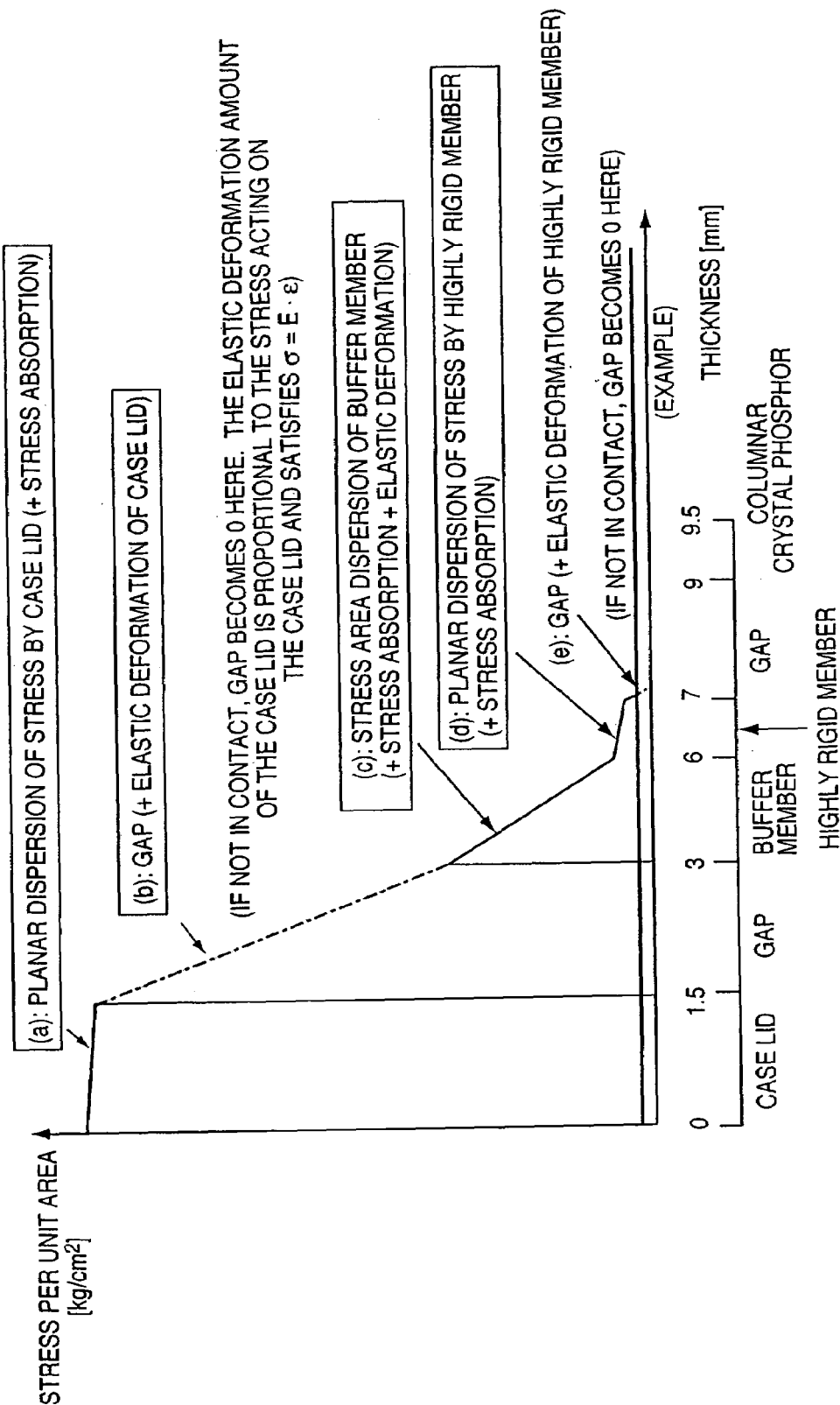

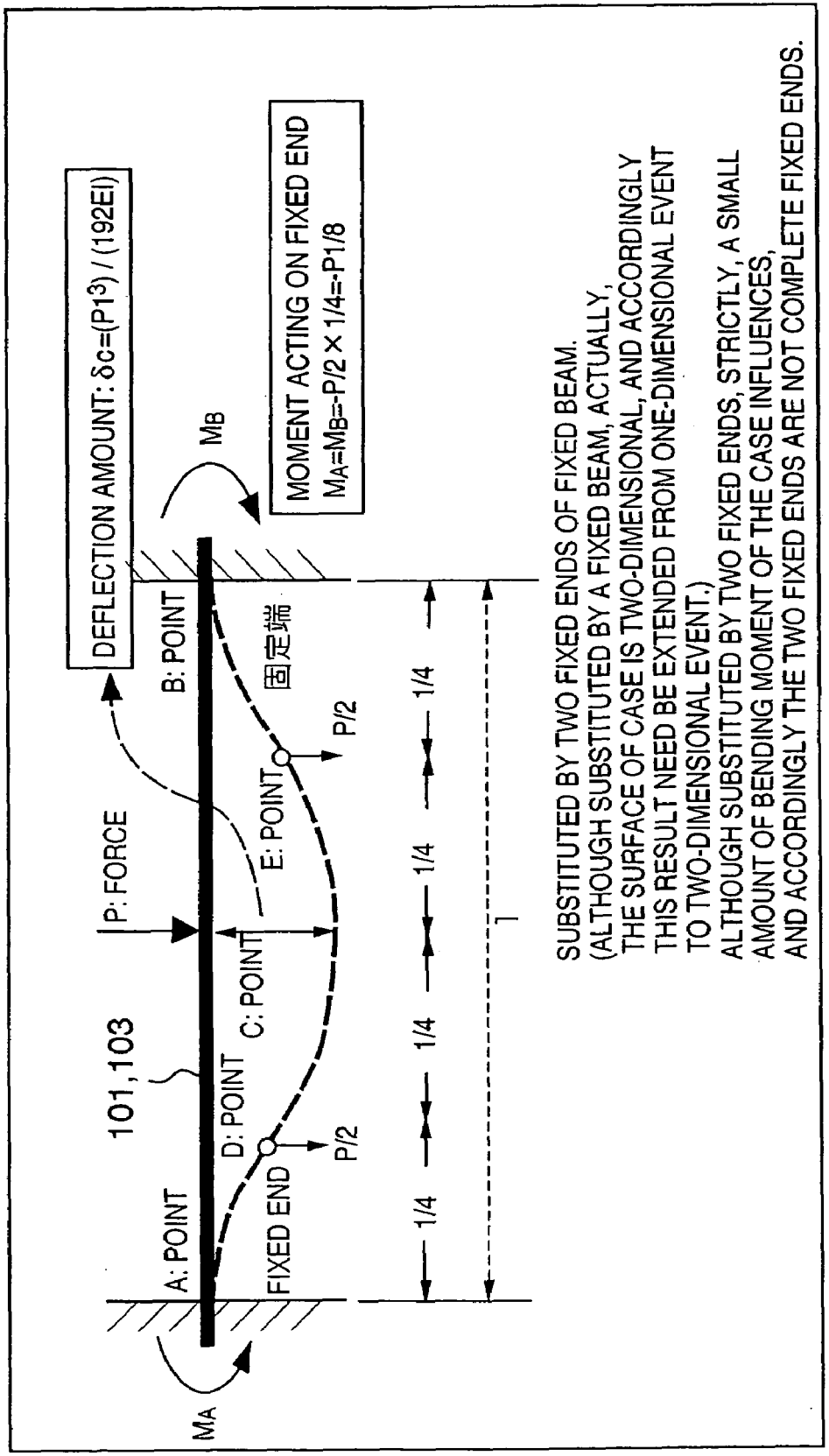

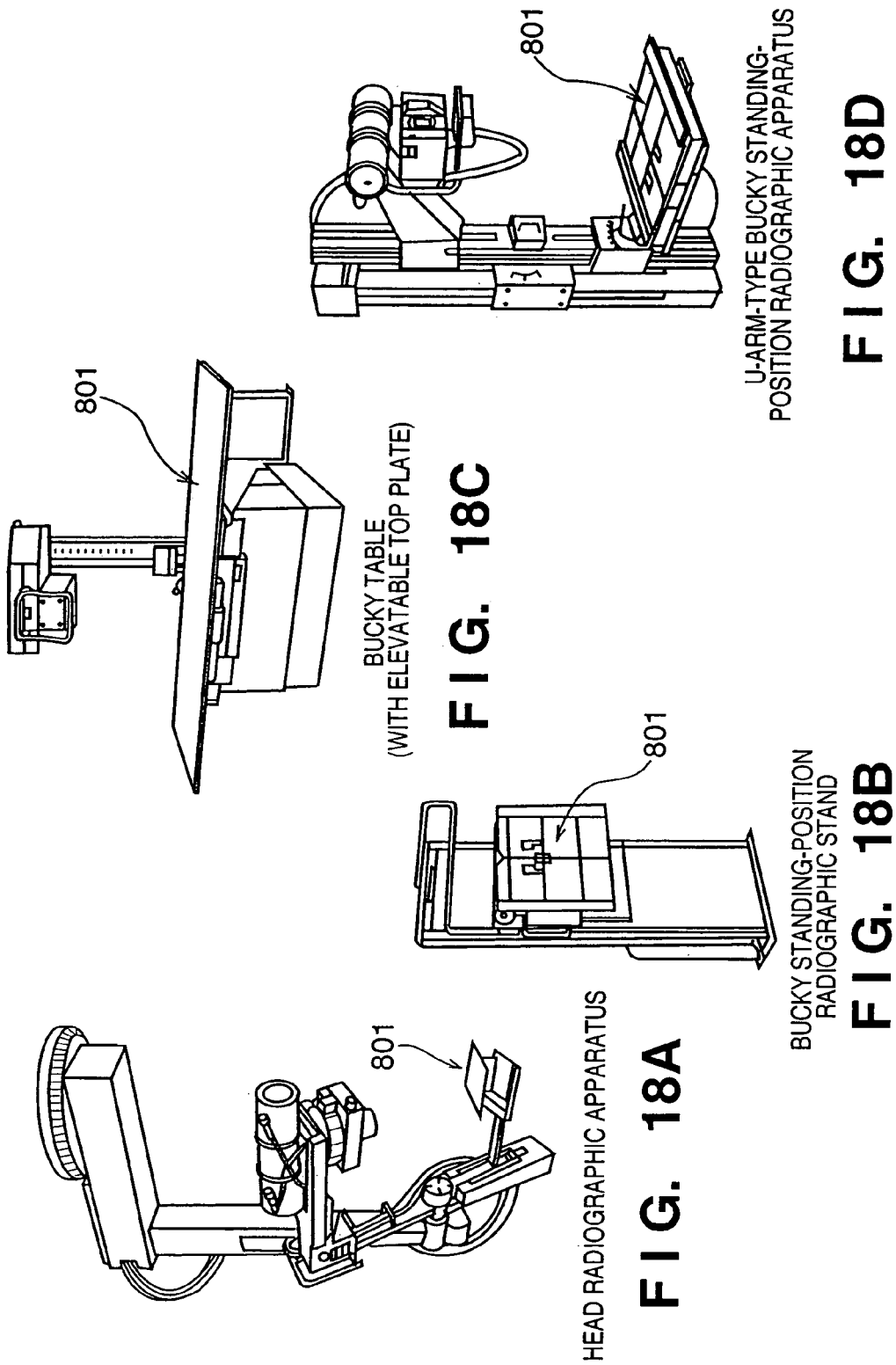

CASSETTE TYPE RADIOGRAPHIC APPARATUS

FIELD OF THE INVENTION

The present invention relates to a cassette type radiographic apparatus which uses a columnar crystal phosphor.

BACKGROUND OF THE INVENTION

With a conventional radiographic apparatus, an X-ray source projects X-rays to an object (e.g., a medical patient). X-ray beams transmitted through the object are detected to radiograph the object by a screen film cassette, film autochanger, CR (Computed Radiography), FPD (Flat Panel Detector), or the like.

In the field of radiography, a high-resolution solid X-ray detector which uses an FPD is proposed. This solid X-ray detector has an X-ray sensor including a two-dimensional array in which arrays of 3,000 to 4,000 photoelectric conversion devices (e.g., photodiodes) are arrayed two-dimensionally. Each photoelectric conversion device generates an electrical signal corresponding to the X-ray dose projected to the X-ray sensor. The X-ray image of an object is obtained by arranging the object between an X-ray source and X-ray sensor and converting the X-ray dose which has been transmitted through the object into an electrical signal. A signal from each photoelectric conversion device is read out individually and digitized, and thereafter image-processed, stored, or displayed.

FIG. 9 is a conceptual view showing the structure of a system which includes a conventional cassette type radiographic apparatus. As shown in FIG. 9, a radiographic apparatus 801 incorporates an X-ray detector 802. X-rays generated by an X-ray generator 803 irradiate an object 804. The X-rays transmitted through the object 804 are detected by photoelectric conversion devices (not shown) which are arrayed like a matrix on the X-ray detector 802. Electrical signals output from the photoelectric conversion devices are image-processed by an image processor 805 to display the X-ray image of the object 804 on a display 806 such as a monitor.

In recent years, a low-profile, higher-density mounting technique has improved, and a compact, low-profile solid X-ray detector which uses an FPD is becoming possible, e.g., an X-ray screen film cassette (see Japanese Patent Laid-Open Nos. 2003-057352 and 2002-186604).

FIG. 10 is a side sectional view showing an example of a cassette type radiographic apparatus which uses an FPD. As shown in FIG. 10, an electronic cassette used for radiography or the like has a particle phosphor 131, e.g., GOS, which converts X-rays into visible light, a MIS photosensor portion 115 which uses amorphous silicon and photoelectric conversion devices 109 which are arranged like a matrix to convert the visible light into electrical signals, a TFT switching portion 116, a base 110, a circuit board 111 which supports the base 110, a circuit board 113 on which electronic components for processing the photoelectrically converted electrical signals are mounted, wiring lines 114, case lid 101 which is used to house the above members, and a case main body 117. A buffer member 102 serving as a relaxation portion that relaxes a force from outside the housing is arranged between the case lid 101 and particle phosphor 131. A resin 130 made of PET or the like is arranged between the buffer member 102 and particle phosphor 131.

The particle phosphor 131 is adhered to the photoelectric conversion devices 109 by an adhesion layer 106 through a second protection layer 107 made of an organic substance such as PI and a first protection layer 108 made of a nitride or the like. The circuit board 111 on which the electronic components 113 for processing the electrical signals photoelectrically converted by the photoelectric conversion devices 109 are mounted is planarly attached to the lower surface of the base 110 in tight contact through an insulating sheet 112.

Conventionally, in the electronic cassette which uses the particle phosphor 131 such as GOS, the photoelectric conversion devices 109 which are made of a component such as glass are more vulnerable to an external force than the particle phosphor 131 and protection layers 107 and 108. Therefore, a cassette type radiographic apparatus which uses an FPD has been designed with reference to the strength of the photoelectric conversion devices 109.

In the conventional cassette type radiographic apparatus which uses the FPD, problems occur when a columnar crystal phosphor such as CsI (cesium iodide crystal) is used in place of the particle phosphor 131. The reasons of the problems are roughly classified into two. According to the first reason, the columnar crystal phosphor is fractured by a weaker external force than the photoelectric conversion devices made of a component such as glass. As the columnar crystal phosphor is more vulnerable to the external force, the conventional technique for protecting the photoelectrical conversion devices cannot sufficiently protect the columnar crystal phosphor. According to the second reason, as the columnar crystal phosphor has stricter demands for an external force acting on a small area than a granular phosphor used in the conventional cassette type radiographic apparatus using the FPD, the crystals of the columnar phosphor may be broken. When a stress is applied, holes may be formed in the protection film by steps formed by variations in crystal length.

According to the prior art, a standing- or lying-position radiographic apparatus is available which uses a columnar crystal phosphor and an FPD. When this apparatus is used as a portable cassette type radiographic apparatus, problems occur. The reasons of the problems are roughly classified into two. According to the first reason, unlike the standing- or lying-position portable cassette type radiographic apparatus, the portable cassette type radiographic apparatus is used in various applications, and accordingly the weight of the object may be applied to it. Therefore, a stress absorbing portion which is not necessary in the standing- or lying-position radiographic apparatus is necessary in the portable cassette type radiographic apparatus in case various types of external forces are applied when, e.g., the operator erroneously hits the apparatus with something from above or places his or her elbow on the apparatus. According to the second reason, the cassette type radiographic apparatus is not provided with a grid space. The standing- or lying-position radiographic apparatus usually uses a scattered ray removing mechanism (grid), and the scattered ray removing mechanism (grid) serves as a stress absorbing portion. In the cassette type radiographic apparatus, however, the radiographic target is often a body portion, e.g., a limb, which does produce many scattered rays, and accordingly a scattered ray removing mechanism (grid) is not usually mounted due to the requirements for a lower profile and lighter weight. Therefore, a structure is necessary which protects the columnar crystal phosphor from the external force.

In the cassette type radiographic apparatus, for achieving a lower profile., a gap must be minimized as small as possible in the direction of thickness of the cassette. With a small gap, however, if something is erroneously dropped on the case to deform it elastically, the phosphor may be broken at a high possibility. In particular, in the case of a columnar crystal phosphor such as CsI, when the stress acts on the crystals to break the phosphor crystals, the directional characteristics of light in the phosphor change, and a scar may be undesirably present in an image obtained by X-ray irradiation.

FIGS. 11A to 11D show images obtained when a stress acts on the columnar crystal phosphor to break the phosphor crystals. After an experiment (FIG. 11A) of dropping a screwdriver onto the columnar crystal phosphor (CsI: Tl$^+$) was conducted, the columnar crystal phosphor was adhered to photoelectric conversion devices, and radiography was performed (FIG. 11B). As shown in FIG. 11B, a large hitting mark ranging for a diameter of 3 mm appears on the image. FIG. 11C is a graph showing the sectional profile of an output value of a photodetector taken along the line A–A' of FIG. 11B. As shown in FIG. 11C, a portion where the optical output increases by about 10% and a portion where the optical output decreases by about 10% are present. FIG. 11D Is a graph showing the sectional profile of the output value of the photodetector taken along the line B–B' of FIG. 11B. As shown in FIG. 11D, many portions are obviously present where the optical output increases by about 10%. In this manner, with reference to FIGS. 11C and 11D, portions where the output value Increases or decreases are obviously present, and a difference in output value is as large as ±10%. The output value fluctuates probably because the phosphor crystals are broken and a light-outputting portion changes. As is apparent from the experimental images of. FIGS. 11A to 11D, since the columnar crystal phosphor has a low strength, even when only a lightweight material such as a screwdriver is erroneously dropped, it forms a scar In the image to cause a clinical problem.

SUMMARY OF THE INVENTION

The present invention has been made in view of the above problems, and has as its object to decrease a stress which acts on the columnar crystal phosphor.

According to the present invention, there is provided a cassette type radiographic apparatus comprising a columnar crystal phosphor which converts X-rays into visible light, a photodetector which converts the visible light into an electrical signal, and a case which houses the columnar crystal phosphor and photodetector, wherein a relaxation member which relaxes a force from outside the case and a highly rigid member which has higher rigidity than that of the columnar crystal phosphor are arranged between the case and columnar crystal phosphor.

According to the present invention, a stress which acts on the columnar crystal phosphor can be decreased.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing layer structures according to the preferred embodiments of the present invention;

FIG. 12 is a graph showing a stress flow per unit area;

FIG. 17 is a graph showing the deflection amount of the case lid (or highly rigid member); and FIGS. 18A to 18D are views showing application examples to various types of radiographic systems in each of which a cassette type radiographic apparatus can be set.

DETAILED DESCRIPTION OF THE PREFERRED EMBODIMENTS

The preferred embodiments of the present invention will be described in detail with reference to the accompanying drawings.

(First Embodiment)

Figure 1:
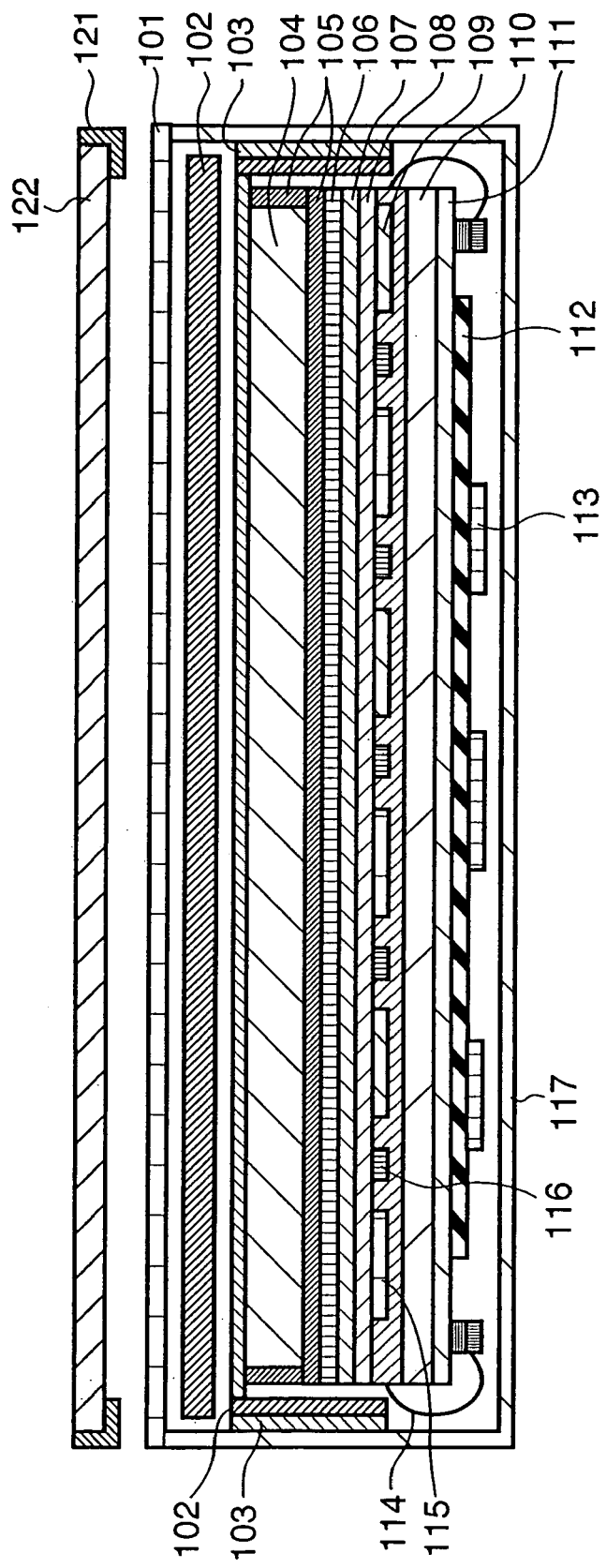
FIG. 1 is a view showing the first preferred embodiment of the present invention.

The first preferred embodiment of the present invention will be described in detail. FIG. 1 is a sectional view of a cassette type radiographic apparatus which uses a columnar crystal phosphor according to the first embodiment of the present invention. The cassette type radiographic apparatus of the first embodiment includes a columnar crystal phosphor 104 which converts X-rays into visible light, a photodetector including photoelectric conversion devices 109 which convert the visible light converted by the columnar crystal phosphor 104 into electrical signals, and a case which houses the columnar crystal phosphor 104 and photoelectric conversion devices 109. The case includes a case lid 101 which has an X-ray incident surface and a case main body 117 which supports the case lid 101. A buffer member 102 which buffers a force from outside the case and a highly rigid member 103 which is more rigid than the columnar crystal phosphor 104 are arranged between the case and the columnar crystal phosphor 104. The buffer member 102 and highly rigid member 103 are preferably arranged between the case lid 101 and columnar crystal phosphor 104. Then, the columnar crystal phosphor 104 can be protected from a stress applied from above the case main body 117. The buffer member 102 and highly rigid member 103 are desirably arranged between the columnar crystal phosphor 104 and surfaces that surround the side of the case main body 117. Then, the columnar crystal phosphor 104 can be protected from a stress applied from the side of the case main body 117. The columnar crystal phosphor 104 is deposited on the highly rigid member 103 which is not largely strained by an external force and has a protection film (not shown).

Water protection layers 105 which protect the columnar crystal phosphor 104 from water are arranged on the side surfaces and lower surface of the columnar crystal phosphor 104. The columnar crystal phosphor 104 is adhered to the photoelectric conversion devices 109 by an adhesion layer 106 through a second protection layer 107 made of an organic substance such as PI and a first protection layer 108 made of a nitride or the like. The photoelectric conversion devices 109 are desirably formed on a base 110 two-dimensionally, and further desirably arrayed in a matrix. The base 110 is desirably formed of a glass plate which does not chemically react with semiconductor devices, stands a process temperature in a semiconductor manufacturing step, and has a high dimensional stability.

A circuit board 111 on which electronic components 113 for processing the electrical signals photoelectrically converted by the photoelectric conversion devices 109 are mounted is planarly attached to the lower surface of the base 110 in tight contact through an insulating sheet 112. The circuit board 111 and photoelectric conversion devices 109 are connected to each other through flexible circuit boards 114. The electronic components 113 are mounted on one surface of the circuit board 111. The circuit board 111 is supported, at its surface where the electronic components 113 are not mounted, by the ends of the lower surface of the base 110 through the insulating member 112.

The insulating member 112 is made of rubber, silica glass, or the like, to electrically disconnect the base 110 made of a metal from the circuit board 111 and the electrical components 113 mounted on the circuit board 111. The flexible circuit boards 114 have signal lines and control lines to read the electrical signals from the photoelectric conversion devices 109. Each flexible circuit board 114 extends beside the base 110 and bypasses to the circuit board 111.

In the cassette type radiographic apparatus according to the first embodiment; usually a scattered ray removing mechanism (grid) 122 is not mounted. This is because in the cassette type radiographic apparatus according to the first embodiment, the radiographic target is often a body portion, e.g., a limb, which does not produce many scattered rays. Even with the radiographic apparatus of the first embodiment, however, sometimes a body portion such as chest or abdomen which produces many scattered rays can be a radiographic target. Therefore, the scattered ray removing mechanism (grid) 122 may be attached through a scattered ray removing grid attaching jig 121. The scattered ray removing mechanism (grid) 122 is usually made by mixing lead and Al (or carbon) and accordingly very rigid. Therefore, when the scattered ray removing mechanism (grid) 122 is to be mounted, it can serve as a stress absorbing portion. As a result, when the scattered ray removing mechanism (grid) 122 is mounted, considering the external force that can be applied, the presence of other stress absorbing portions may lead to over-specifications. When the scattered ray removing mechanism (grid) is not mounted, such other stress absorbing portions are necessary. In FIG. 1, when the scattered ray removing mechanism (grid) 122 is removed, a stress absorbing portion may be provided to replace it.

In the first embodiment, the reason why the highly rigid member 103 is employed as the deposition substrate for the columnar crystal phosphor 104 will be described. In order to realize a high sensitivity and low noise, the radiographic apparatus must have a high X-ray transmittance and low material nonuniformities as specifications required for a material present between the object and phosphor. Accordingly, the less the material arranged between the object and phosphor, the more desirable. This is because the larger the amount of material arranged between the object and phosphor, the more the X-rays are absorbed, and a high sensitivity cannot be obtained. This is also because the nonuniformities of the material arranged between the object and phosphor appear in the image to increase the noise amount. In order to satisfy both of the above required specifications, according to the first embodiment, the highly rigid member 103 also serves as the deposition substrate. When the highly rigid member 103 also serves as the deposition substrate, the number of components arranged between the object and phosphor decreases, so that a high X-ray transmittance and low material nonuniformities can be realized.

The function and operation of a stress dispersing portion according to the present invention will be described in the following sequence. First, a description will be made on what stress can be generated in a cassette type radiographic apparatus, and how a columnar crystal phosphor such as CsI reacts against such a stress to bring about what result. Then, a description will be made on how the stress is dispersed to bring about what result.

First, how the stress is generated will be described. In the cassette type radiographic apparatus, as the cassette type radiographic apparatus is used in various applications, the weight of the object may be applied to it, the operator may erroneously hit it with something from above, or the operator may place his or her elbow on it, and accordingly a stress can be generated. When such an external stress directly acts on the columnar crystal phosphor such as CsI, the columnar crystal phosphor can be fractured because its material has a low yield point. Since the columnar crystal phosphor serves to convert X-rays into light, if it is partly fractured, the fractured portion remains as an artifact in the radiographed image. This is because in the fractured portion of the columnar crystal phosphor, the distribution of the thickness of a portion which converts the X-rays into light may change, the path of the visible light may change, or the visible light may be interfered with from traveling to the corresponding pixel. As a result, as pointed out regarding the above problems, a low-sensitivity portion and high-sensitivity portion are formed as artifacts in the radiographed image to appear as a scar in the image. The fracture in this specification refers to a state wherein a stress exceeding the elastic limit of each material acts and the material cannot be reversed to the initial condition. The external force refers to forces including a static pressure, impact pressure, vibration, and the like, that act on the crystals of the columnar phosphor from outside each material. Plastic deformation of this specification includes not only deformation regardless of the directivity in a case wherein a stress exceeding the yield point of the material merely acts on the material, but also macroscopic plastic deformation as a set of shearing deformation which occurs when a slip occurs in a crystal in a plane called a slip plane. Note that plastic deformation also includes hardening which accompanies machining and is caused as a trouble in the crystal during shearing deformation which interferes with shearing deformation.

How to disperse the stress will be described. FIG. 12 is a graph showing the stress flow per unit area. In FIG. 12, the axis of ordinate represents the stress per unit area [kg/cm$^2$], and the axis of abscissa represents the thickness (distance) [mm] from the surface of the case.

First, referring to (a) in FIG. 12, how the external force applied to the surface of the case from outside acts on the case lid 101 will be described. Within the thickness of the case lid 101, the main operation of the external force which is applied to the surface of the case from outside mainly operates for stress planar dispersion and stress absorption. External forces which operate in this manner are absorbed by the displacement (particularly, deformation and distortion to be described later) of the case lid 101, and a kinetic energy and heat energy accompanying it.

Referring to (b) in FIG. 12, the operation of the gap will be described. The operation of the gap is closely related to the elastic deformation amount of the case lid 101. When the gap is sufficiently wide to be wider than the maximal strain limit of the case lid 101, the stress is not transmitted to a member under the gap. In this case, the kinetic energy of the external force is converted into a kinetic energy required until the case lid 101 deflects to be restored to the initial state, and a heat energy or the like which is generated in the case lid 101. Even when the width of the gap is smaller than the maximal strain limit, if the stress acting on the case lid 101 is also small, the case lid 101 does not come into contact with the buffer member 102 which is located under the gap, and accordingly the stress is not transmitted to the buffer member 102. When the case lid 101 comes into contact with the buffer member 102, the stress is transmitted to the contact surface of the buffer member 102. Referring to (b) in FIG. 12, the flow of the stress in the gap is indicated by a broken line because the inclination of the stress transmission is changed by the width of the gap and the deflection amount. When the case lid 101 deflects, if the case lid 101 does not come into contact with the material under the gap, the stress is entirely absorbed by the deflection of the case lid 101, and accordingly not transmitted to the material under the gap. In the standing- or lying-position radiographic apparatus, a sufficiently large gap can be reserved. In a cassette type radiographic apparatus, sometimes a sufficiently large gap cannot be reserved partly due to the requirement for a low profile. In this case, the buffer member 102 is arranged under the gap. As the buffer member 102, a sheet-type material made of rubber or gel may be used, or a silicone- or urethane-based foam may be used, as will be described later.

Subsequently, the operation of the buffer member 102 will be described with reference to (c) in FIG. 12. The operation of the buffer member 102 is (1) to enlarge the area where the stress is to be applied, to decrease the stress per unit area, and (2) to absorb the energy of the stress by the heat energy of the buffer member 102. In particular, (1), that is, to decrease the stress per unit area by stress dispersion of the buffer member 102 is the main effect of the buffer member 102. Although the buffer member 102 itself may deflect, as the deflection is larger than the force, the buffer member 102 is usually adhered to the highly rigid member 103 to be described later. Consequently, the deflection of the highly rigid member 103 dominates over that of the buffer member 102 itself, and the operation of absorbing the stress by the deflection of the buffer member 102 itself is very small.

The operation of the highly rigid member 103 will be described with reference to (d) in FIG. 12. When the external stress reaches the buffer member 102, some stress is transmitted to the highly rigid member 103 located behind the buffer member 102. Without the highly rigid member 103, after the stress is absorbed by the buffer member 102, a force does not uniformly act on the columnar crystal phosphor 104, and a locally strong stress acts on it. Consequently, a locally large force may act on the columnar crystal phosphor 104 to fracture the crystals. According to this embodiment, the highly rigid member 103 is arranged under the buffer member 102 to uniformly disperse the stress that cannot be completely prevented by the above (a) to (c) in FIG. 12, so that a locally large force does not act on the columnar crystal phosphor 104. Also, as indicated by (e) in FIG. 12, a structure may be employed in which a gap is provided between the highly rigid member 103 and columnar crystal phosphor 104 so the highly rigid member 103 does not come into contact with the columnar crystal phosphor 104. Although the gap of (e) in FIG. 12 is not shown in FIG. 1, an arrangement may be employed in which a gap is present between the highly rigid member 103 and columnar crystal phosphor 104.

Figure 13:
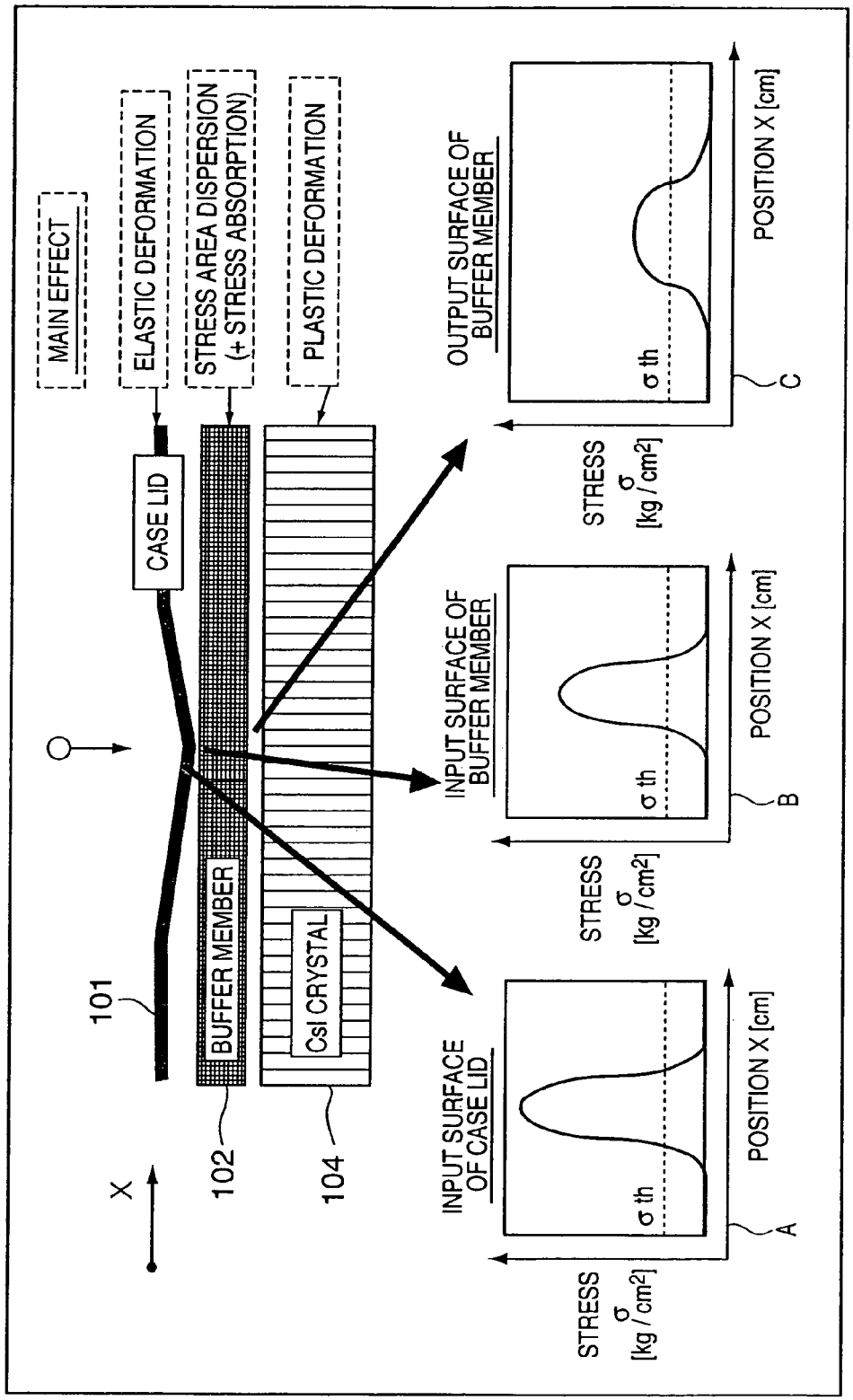
FIG. 13 includes a view and graphs of stress dispersion which occurs when a stress acts on the columnar crystal phosphor.
Figure 14:
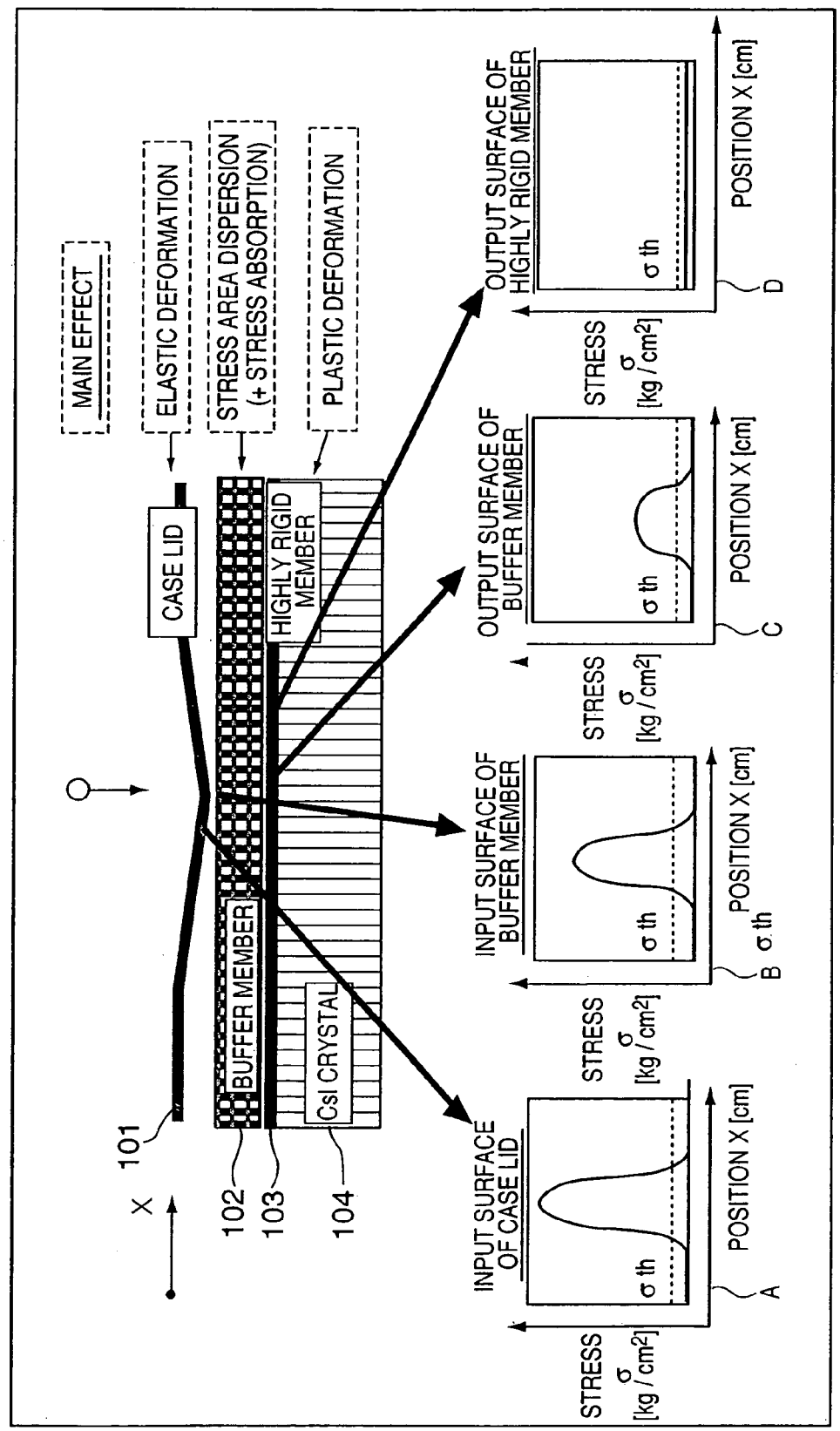
FIG. 14 includes a view and graphs of stress dispersion which occurs when a stress acts on the columnar crystal phosphor.

Stress transmission in the cassette type radiographic apparatus will be described. FIG. 13 includes a view and graphs showing the idea of stress transmission in the conventional cassette type radiographic apparatus. FIG. 14 includes a view and graphs showing the idea of stress transmission in the cassette type radiographic apparatus according to this embodiment. Transmission stress of FIG. 13 and that of FIG. 14 will be described in comparison.

The difference between the prior art of FIG. 13 and this embodiment of FIG. 14 is the presence/absence of the highly rigid member between the buffer member 102 and columnar crystal phosphor 104. More specifically, in the prior art, nothing is inserted between the columnar crystal phosphor 104 and buffer member 102, whereas in this embodiment, the highly rigid member 103 is inserted between the buffer member 102 and columnar crystal phosphor 104. According to this embodiment, as the highly rigid member 103 is inserted between the buffer member 102 and columnar crystal phosphor 104, the force acting on the columnar crystal phosphor 104 is dispersed to be substantially uniform in the plane. When a gap is present between the highly rigid member 103 and columnar crystal phosphor 104, the stress acting on the columnar crystal phosphor 104 further decreases.

A to C in FIG. 13 and A to D in FIG. 14 show stress distributions in the X-direction position on the respective material surfaces. A to C in FIG. 13 and A to D in FIG. 14 are graphs showing the idea of stress distribution in the input and output surfaces of the respective materials of the prior art and this embodiment. In FIGS. 13 and 14, the distributions of the stresses to be input to the case lid 101 are the same. A large difference exists between a case wherein the arrangement of the prior art is employed and a case wherein the arrangement of this embodiment is employed. In the arrangement of this embodiment, the stress per unit area acting on the columnar crystal phosphor 104 obviously decreases.

Planar dispersion of the stress by the case lid 101 in FIGS. 13 and 14 will be described. An external force is applied to the case lid 101 due to various reasons. For example, as the cassette type radiographic apparatus is used in various applications, the weight of the object may be applied to it, the operator or patient may erroneously hit it with something from above, or the operator or patient may place his or her elbow on it. Among these reasons, the strictest condition that can be applied to the columnar crystal phosphor 104 may be the case wherein the operator or patient erroneously drops a heavy material. Hence, FIGS. 13 and 14 show the idea of a case wherein a heavy steel ball is dropped. Regarding the external force generated in this manner, assume that a stress acting on the case lid 101, a highly rigid member, or the like, when something is dropped onto the case lid 101, is defined as σ [kg/cm²]. According to Hooke's law, when the stress is small, a value obtained by dividing the stress σ by a longitudinal elastic coefficient E is a strain amount ε. This will be described later in detail with reference to FIG. 16. Regarding the deflection generated in the case lid 101, highly rigid member 103, or the like, its simplified model will be described later with reference to FIG. 17.

Stress transmission in the conventional cassette type radiographic apparatus will be described with reference to FIG. 13.

The graph A in FIG. 13 shows the stress distribution obtained when a heavy steel ball is dropped onto the case lid 101. As shown by the graph A, the stress acting on the input surface of the case lid 101 is much larger than a fracture limit stress $\sigma_{th}$ of the columnar crystal phosphor 104. The graph B in FIG. 13 shows the stress distribution in the input surface of the buffer member 102. The case lid 101 elastically deforms to absorb the stress applied to it, and the remaining stress is applied to the input surface of the buffer member 102. As shown by the graph B, the stress acting on the input surface of the case lid 101 is still larger than the fracture limit stress $\sigma_{th}$ of the columnar crystal phosphor 104. The graph C in FIG. 13 shows the stress distribution in the output surface of the buffer member 102. The stress per unit area applied to the buffer member 102 is decreased by the operation of the buffer member 102 to absorb the energy of the stress. The remaining stress is applied to the output surface of the buffer member 102. As shown by the graph C, the stress acting on the output surface of the buffer member 102 is still larger than the fracture limit stress $\sigma_{th}$ of the columnar crystal phosphor 104. Consequently, a stress larger than the fracture limit stress $\sigma_{th}$ of the columnar crystal phosphor 104 is applied to the columnar crystal phosphor 104 to likely fracture its crystals.

Stress transmission in the cassette type radiographic apparatus according to this embodiment will be described with reference to FIG. 14.

In FIG. 14, A to C show states wherein the stresses acting on the respective members are much larger than the fracture limit stress $\sigma_{th}$ of the columnar crystal phosphor 104. In FIG. 14, D is a graph showing the stress distribution in the output surface of the highly rigid member 103. In the output surface of the highly rigid member 103, the stress is dispersed substantially uniformly by the operation of the highly rigid member 103, so that a locally large force is prevented from acting on the columnar crystal phosphor 104. As shown by the graph A, the stress acting on the output surface of the highly rigid member 103 is smaller than the fracture limit stress $\sigma_{th}$ of the columnar crystal phosphor 104. Hence, only a stress smaller than the fracture limit stress $\sigma_{th}$ of the columnar crystal phosphor 104 is transmitted to the columnar crystal phosphor 104, so that crystal fracture can be prevented.

Stress transmission in another cassette type radiographic apparatus according to this embodiment will be described with reference to FIG. 15.

Figure 15:
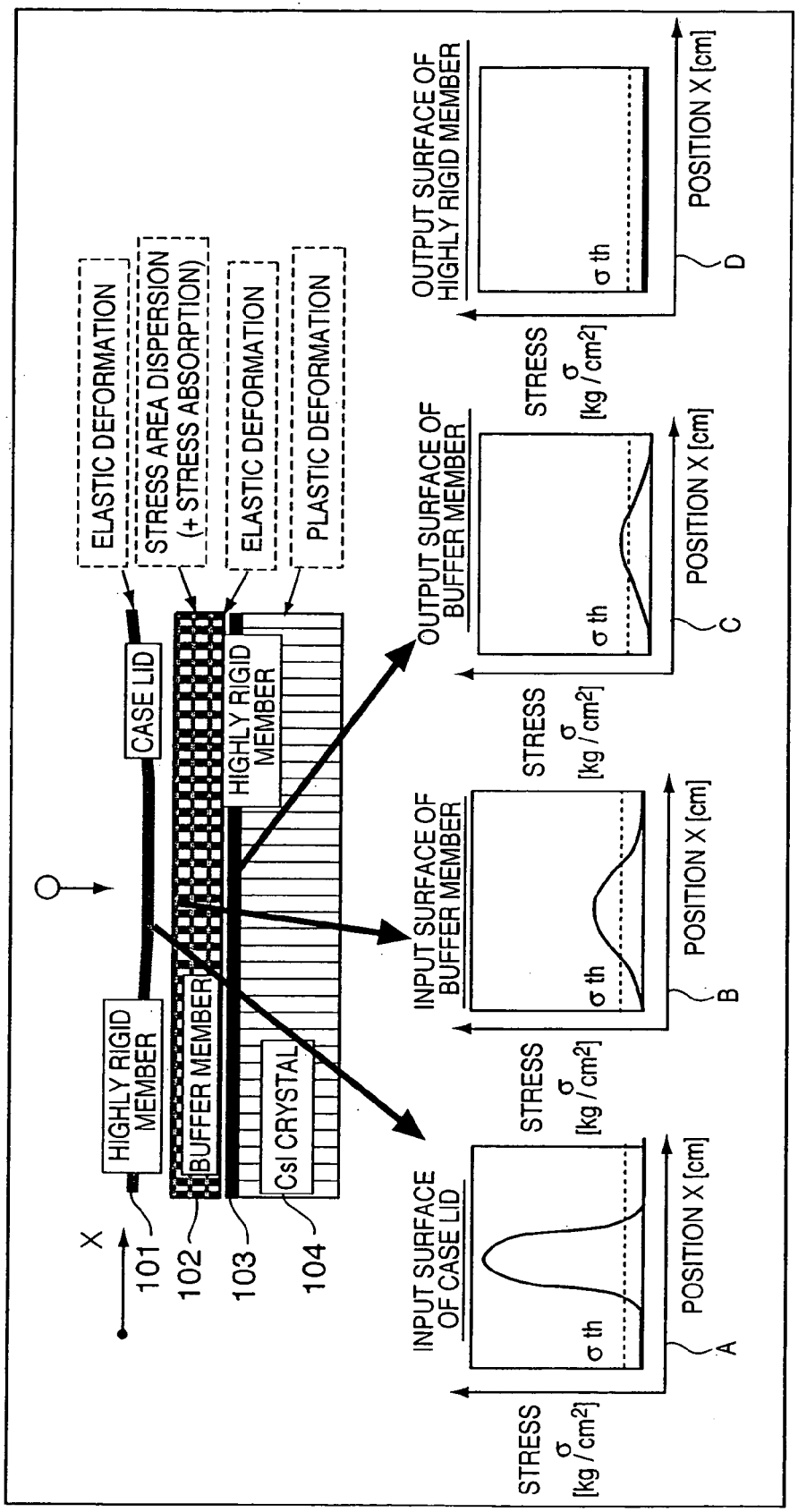
FIG. 15 includes a view and graphs of stress dispersion which occurs when a stress acts on the columnar crystal phosphor.

The difference between the prior art of FIG. 13 and the embodiment of FIG. 15 resides in (1) the rigidity of the case lid 101, and (2) the presence/absence of a highly rigid member between the buffer member 102 and columnar crystal phosphor 104. Regarding (1), in the prior art, a material having comparatively low rigidity is used to form the case lid 101, whereas in this embodiment, a highly rigid member having rigidity higher than that of the columnar crystal phosphor 104 is used as the case lid 101. According to this embodiment, since the highly rigid member is used as the case lid 101, the gap can be formed shallow, and accordingly the radiographic apparatus can be made to have a low profile. According to this embodiment, the external force per unit area which acts on the buffer member 102 can be decreased comparatively small. Regarding (2), in the prior art, nothing is inserted between the columnar crystal phosphor 104 and buffer member 102, whereas in this embodiment, the highly rigid member 103 is inserted between the buffer member 102 and columnar crystal phosphor 104. According to this embodiment, since the highly rigid member 103 is inserted between the buffer member 102 and columnar crystal phosphor 104, the force acting on the columnar crystal phosphor 104 is dispersed to be substantially uniform in the plane. If a gap is present between the highly rigid member 103 and columnar crystal phosphor 104, the stress acting on the columnar crystal phosphor 104 decreases greatly.

A to D in FIG. 15 show stress distributions at the X-direction positions in the respective material surfaces. A to D in FIG. 15 are graphs showing the idea of stress distribution in the input and output surfaces of the respective materials of this embodiment. In FIG. 15, the distributions of the stresses to be input to the case lid 101 are the same.

Stress transmission in another cassette type radiographic apparatus according to this embodiment will be described with reference to FIG. 15.

The graphs A to D in FIG. 15 show the stress distributions obtained when a heavy steel ball is dropped onto the case lid 101 formed of a highly rigid member. As shown by the graph A, the stress acting on the input surface of the case lid 101 is much larger than the fracture limit stress $\sigma_{th}$ of the columnar crystal phosphor 104. The graph B in FIG. 15 shows the stress distribution in the input surface of the buffer member 102. The case lid 101 elastically deforms to absorb the stress applied to it, and the remaining stress is applied to the input surface of the buffer member 102. As shown by the graph B, the stress acting on the input surface of the buffer member 102 is dispersed in a wide range by the operation of the highly rigid member to decrease a locally large force which is to be applied to the buffer member 102. The stress acting on the input surface of the buffer member 102 is obviously still larger than the fracture limit stress $\sigma_{th}$ of the columnar crystal phosphor 104. The graph C in FIG. 15 shows the stress distribution in the output surface of the buffer member 102. The stress per unit area applied to the buffer member 102 is decreased by the operation of the buffer member 102 to absorb the energy of the stress. The remaining stress is applied to the output surface of the buffer member 102. As shown by the graph C, however, the stress acting on the output surface of the buffer member 102 is still larger than the fracture limit stress $\sigma_{th}$ of the columnar crystal phosphor 104. The graph D in FIG. 15 shows the stress distribution in the output surface of the highly rigid member 103. In the output surface of the highly rigid member 103, the stress acting on the highly rigid member 103 is dispersed substantially uniformly by the operation of the highly rigid member 103, so that the stress is decreased substantially completely. Therefore, the stress acting on the columnar crystal phosphor 104 is removed substantially completely to prevent crystal fracture more effectively.

Figure 16:
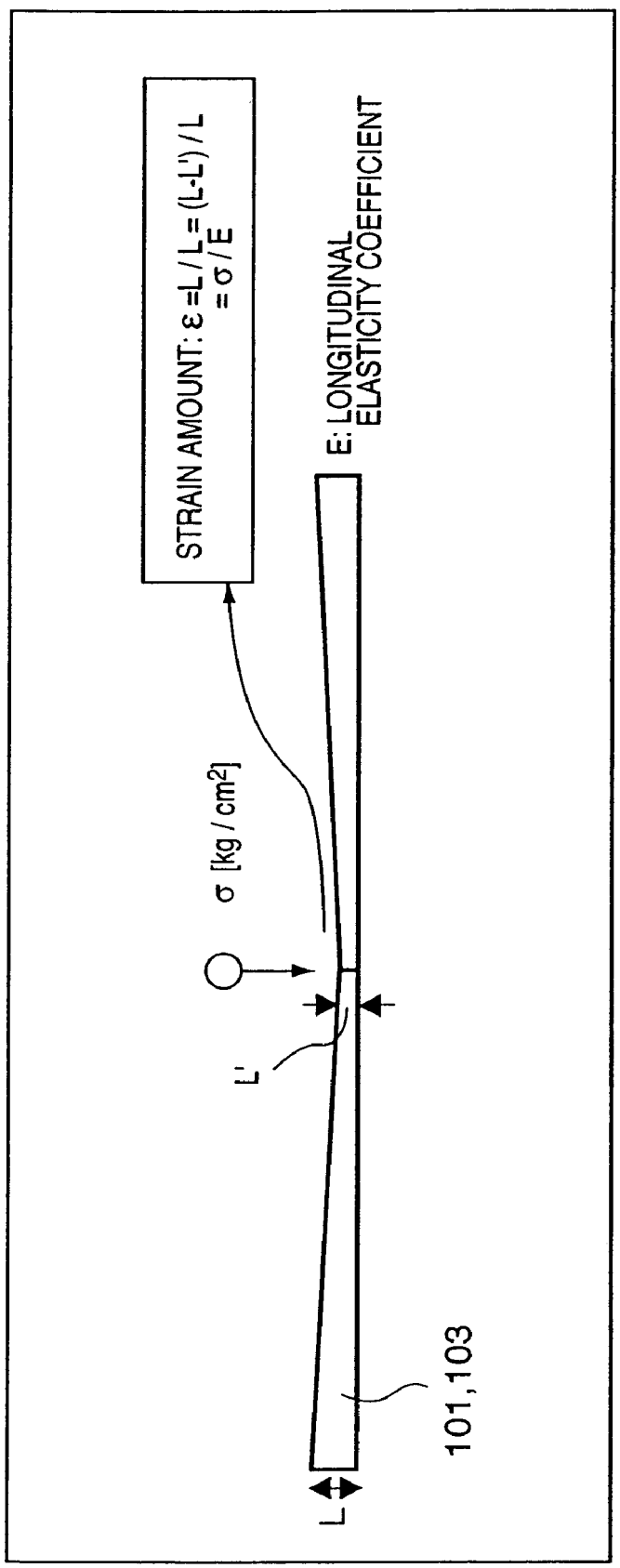
FIG. 16 is a view showing the strain amount of a case lid (or highly rigid member)

FIG. 16 is a view showing a strain amount ε of the case lid 101 (or highly rigid member 103). When the stress σ is applied, the resultant strain amount is expressed by $\epsilon=\Delta L/L=(L-L')/L=\sigma/\epsilon$ where L is the original thickness of the case lid 101 (buffer member), L' is the thickness of the case lid 101 (buffer member) when the stress σ is applied, and E is the longitudinal elastic coefficient of the case lid 101 (buffer member).

FIG. 17 is a graph showing a deflection amount δσ of the case lid 101 (or highly rigid member 103 ). The deflection amount δc shows a deflection amount obtained when the case lid 101 is supposed to be a fixed beam. Upon application of a force P to the center of the case lid 101, how the force acts on the case and what will become of the deflection amount δc will be described. The deformation state is to be checked. A point D and point E are the points of inflection of the elastic line of the fixed beam. At the points D and E, the curvature is 0 (radius of curvature ρ=∞). Assuming that the sectional secondary moment of the fixed beam in the two-end direction is defined as I and that the bending moment is defined as M, equation (1) is established:

$$\frac{1}{\rho} = \frac{M}{EI} \quad (1)$$

From equation (1), the bending moment does not act on the cross-sections at the points D and E.

Therefore, if the beam is cut at the points D and E and a concentrated force equal to a shearing force F acting on the points D and E of the beam of FIG. 17 is applied to each section, the beam can be maintained in completely the same deformation state as before. When the beam is cut at a general section where the bending moment acts, the deformation state before cutting can be maintained only when, in addition to the shearing force F, a concentrated moment equal to the bending moment that has occurred in the section before cutting is applied to the section. The magnitude of the shearing force F applied to the points D and E is P/2 from the balance of force in a beam portion DE.

Hence, the fixed beam of FIG. 17 is dynamically equivalent to four continuous beams on the distal end of which a concentrated force of P/2 acts (length of each span=¼). Of the four continuous beams, (1) the portion DE can be considered a support beam with a length of ½ which receives a concentrated load of P at its center, and (2) each of portions AD and EB can be considered a cantilevered beam with a length of ¼ which receives a concentrated load of P/2 at its distal end. The deflection amount δc at the central portion is expressed by equation (2):

$$\delta_c = 2 \times \delta_{AD} = 2 \times \frac{\left(\frac{P}{2}\right)\left(\frac{l}{4}\right)^3}{3EI} = \frac{Pl^3}{192EI} \quad (2)$$

where $\delta_{AD}$ is the deflection amount at the distal end of the cantilevered beam AD.

A support moment MA (MB) at the fixed end is equal to the support moment at the fixed end of the cantilevered beam and expressed by equation (3):

$$M_A = M_B = -\frac{P}{2} \times \frac{l}{4} = -\frac{Pl}{8} \quad (3)$$

Note that the negative sign indicates that the operating direction of the actual bending moment is opposite to that of $M_A$ of FIG. 17. In FIG. 17, a beam having two fixed ends substituted for the case lid 101. Actually, however, as the case lid 101 is two-dimensional, the above result must be extended from the one-dimensional event to the two-dimensional event by the finite element method or the like, which can be done by analysis with various types of analyzer software. Although the case lid 101 is substituted by the beam with the two fixed ends in FIG. 17, strictly, the two ends are not complete fixed ends, and the bending moment of the lower case may influence them slightly.

The deflection shown in FIG. 17 also absorbs the stress from the same reason as for the strain. If a gap is present between the case lid 101 (or highly rigid member 103) and buffer member 102 (or columnar crystal phosphor 104), the deflection may not have the effect of absorbing the stress. If the gap is deep, (gap depth)>(maximal deflection depth) may be established. In this case, the stress is entirely absorbed by the case lid 101.

The description on the strain amount and deflection amount described with reference to FIGS. 16 and 17 is not limited to the case lid 101 but can also apply to the buffer member 102 and the like. The difference between the material used to form the case lid 101 and that used to form the buffer member 102 will be described qualitatively. In the case lid 101, a relationship (strain amount)>(deflection amount) is established, whereas in the buffer member 102, the deflection amount of the buffer member 102 itself is not used. In general, as the buffer member 102 distorts excessively largely, it is adhered to a material having a smaller strain amount or packed to have a predetermined volume so that its strain will not increase. Hence, in the buffer member 102, the strain described with reference to FIG. 16 does not pose a problem but the deflection amount described with reference to FIG. 17 does.

The material of the highly rigid member 103 of FIG. 1 will be described to explain a desired embodiment of the highly rigid member 103. First, the required specifications of the highly rigid member 103 will be described. The highly rigid member 103 which is required not only in the arrangement of the first embodiment but also in a cassette type radiographic apparatus according to a preferred embodiment of the present invention is not sufficient if it is merely made of a material having high rigidity. This is due to the following reason. The highly rigid member 103 according to this embodiment is arranged between the object and the columnar crystal phosphor 104. If the X-ray transmittance of the highly rigid member 103 is low, the sensitivity is degraded; if the uniformity of the highly rigid member 103 is poor, noise occurs in the radiographed image. More specifically, the required specifications for the highly rigid member 103 include (1) the material should not deform largely, (2) the material should have a high X-ray transmittance, and (3) the material should be homogenous and free from variations. The first embodiment employs a structure in which the columnar crystal phosphor (CsI) 104 is deposited on the highly rigid member 103. Hence, it is desirable to add further required specifications, that is, (4) the material should have high heat resistance, (5) the expansion coefficient of the material should be close to that of glass, and (6) the material should have high chemical resistance.

As the material of the highly rigid member 103 that satisfies the above required specifications, an amorphous carbon substrate is desirable. This is due to the following reasons. First, amorphous carbon deforms with a small deformation amount when a stress is applied to it. When CFRP is used as amorphous carbon, its modulus of bending elasticity is as small as about 60 Gpa, leading to a small deformation amount. Second, the highly rigid member 103 made of amorphous carbon absorbs less X-rays than another highly rigid member 103 made of glass, aluminum, or the like, and can accordingly transmit much more X-rays to the phosphor layer side. For example, when the respective materials have practical thicknesses (glass plate OA-10 manufactured by Nippon Electric Glass: 0.7 mm; Al plate: 0.5 mm; amorphous carbon plate: 1 mm), any one of them can ensure a transmittance of 90% or more if the photon energy is 60 keV or more. The transmittance decreases sharply when the glass plate OA-10 has a photon energy of 60 keV or less and the Al plate has a photon energy of 35 keV or less. Although the amorphous carbon plate has a larger thickness than any other material, it ensures a transmittance of 95% or more until the photon energy is 20 KeV, and consequently it can exhibit a substantially flat transmittance curve in the X-ray energy region which is employed in the medical applications. Third, amorphous carbon has less material nonuniformities. When CFRP is used as amorphous carbon, the material can have small material nonuniformities in terms of X-ray transmittance, although depending on the weaving method. Fourth, amorphous carbon has excellent heat resistance. Amorphous carbon contains carbon as a major component and accordingly has high heat resistance. Amorphous carbon has higher heat resistance than glass or aluminum. Hence, in the same manner as in a case wherein low-alkali glass is used, the heat resistance of amorphous silicon during deposition poses no problem. Fifth, as the thermal expansion coefficient of amorphous carbon or the like is close to that of glass, the fear of separation or the like due to a difference in expansion rate after adhesion is small. The thermal expansion coefficient of panel glass which is generally employed is $4.6 \times 10^{-6}$, whereas that of amorphous carbon is close to it, i.e., $2.0 \times 10^{-6}$. Sixth, amorphous carbon has high chemical resistance. Amorphous carbon will not be eroded by a strong acid such as hydrofluoric acid, or solvent. Therefore, in the manufacture, countermeasures for static electricity and limitations on chemicals to be used can be eliminated. Seventh, amorphous carbon has high electrical conductivity. Amorphous carbon has electrical conductivity as high as $2.4 \times 10^{-2}$ $\Omega^{-1}$ $cm^{-1}$, better chemical resistance than that of glass, and a thermal expansion coefficient that can be considered substantially equal to that of glass (the thermal expansion coefficient of glass is $2.0 \times 10^{-6}$ and that of amorphous carbon is $4.7 \times 10^{-6}$). Thus, in the manufacture, the fear of static electricity can be decreased, and the manufactured amorphous carbon substrate serves as an electrical noise shield.

From the above reasons, as the material of the highly rigid member, amorphous carbon is desirable. Naturally, this amorphous carbon includes not only noncrystal polymer such as polycarbonate but also FRP (Fiber Reinforced Plastics). CFRP (Carbon Fiber Reinforced Plastics) is more suitable. Particularly, CFRP having a small carbon fiber weaving interval is desirable.

The thickness of the highly rigid member 103 will be described. The thickness of the highly rigid member 103 is determined by the balance with the X-ray transmittance. When amorphous carbon is used as the material of the highly rigid member 103, as compared to low-alkali glass, the X-ray absorption coefficient is low (the X-ray absorption rate of glass is 1.0 $cm^{-1}$ whereas that of amorphous carbon is 0.25 $cm^{-1}$). Hence, even when the thickness of the highly rigid member 103 is set to about 0.1 mm, an X-ray transmittance of about 99.7% can be ensured.

If the highly rigid member 103 is formed of low-alkali glass to have a thickness of about 0.05 mm, for example, even when X-rays enter the highly rigid member 103 with an energy of 60 keV, an X-ray transmittance of about 99.5% can be ensured. The larger the thickness of the highly rigid member 103, the higher the rigidity. Considering the balance with the X-ray transmittance, the thickness of the highly rigid member 103 is desirably of the above degree. In a film type radiographic apparatus, according to JIS, with 100 kVpHVt of 2.7 mm, the X-ray transmittance on the front surface of the sensor should be smaller than 1.0 mmAL equivalent amount. This standard must be satisfied in the radiographic apparatus according to the preferred embodiment of the present invention as well. In particular, the X-ray transmittance of the highly rigid member 103 and buffer member 102 joined together is desirably smaller than 0.7 mmAL equivalent amount. According to the role of the highly rigid member 103, when the highly rigid member 103 is made of a material which deforms with a small amount upon application of a stress, it prevents stress from concentrating on a small region of the columnar crystal phosphor 104. As still another stress absorbing portion, the buffer member 102 which absorbs impact well for its low X-ray transmittance is additionally, desirably used.

The material of the buffer member 102 will be described. As the material of the buffer member, a silicone- or urethane-based foam having a fine structure, or a sheet-type buffer member made of rubber or gel is desirable. In particular, when the weight of the radiographic apparatus is to be decreased, a foam is desirable. When the radiographic apparatus is to have a low profile, a sheet-type buffer member made of rubber or gel is desirable. The buffer member 102 arranged between the case lid 101 and highly rigid member 103 serves to absorb the impact generated when the operator erroneously hits the radiographic apparatus with something from above, and buffer the load which is applied to the apparatus when a subject to be examined is placed on the apparatus, so an excessively large stress will not locally act on the columnar crystal phosphor 104 and photoelectric conversion devices 109. The buffer member 102 has such a size that even when the X-rays enter the effective pixels of the photoelectric conversion devices 109 with an inclination of 45°, the buffer member 102 is present in the entering path substantially uniformly.

The buffer member 102 must satisfy both the buffering performance and X-ray transmittance which are the original objects. To suppress the transmittance, it is appropriate to decrease the thickness and increase the modulus of elasticity of the material. In an experiment, if the coefficient of restitution is 30% or less, it can satisfy a buffering performance and load conditions which are appropriate as a radiographic unit within a thickness that satisfies an appropriate transmittance. An example of a material that satisfies these requirements includes silicone gel. Flame retardancy is also included in the required specifications.

When such a buffer member 102 is selected, it is resistant to an external force and does not largely adversely affect the image quality or X-ray dose when compared to a radiographic apparatus which does not use a buffer member, so that it can be applied to a high-reliability cassette type radiographic apparatus.

A scintillator is specifically manufactured in the following manner. First, a base material, e.g., amorphous carbon, the surface of which is specular-finished by polishing is cleaned, and an aluminum thin film is formed on its surface by sputtering or the like. If the aluminum thin film is excessively thick, it causes irregular reflection with the nonuniformities of its surface; if it is excessively thin, light is undesirably transmitted through it. Accordingly, the aluminum thin film usually desirably has a thickness of 100 nm to 500 nm.

A columnar phosphor layer is formed on the aluminum thin film by deposition. The process temperature at this time exceeds 200° C. Subsequently, a protection layer is formed around the columnar phosphor layer, thus completing a scintillator.

As described above, when a highly rigid member, buffer member, gap, and the like are used as the stress dispersing portion to disperse the stress as shown in FIG. 1, a structure can be realized in which the external force applied to the case does not act on the columnar crystal phosphor.

(Second Embodiment)

The second preferred embodiment of the present invention will be described with reference to FIG. 2.

According to the first embodiment, after the columnar crystal phosphor (CsI) 104 is deposited on the highly rigid member 103, the columnar crystal phosphor (CsI) 104 is adhered to the photoelectric conversion devices 109 by using the adhesion layer 106. In contrast to this, according to the second embodiment, a columnar crystal phosphor (CsI) 104 is directly deposited on photoelectric conversion devices 109 through second and first protection layers 107 and 108.

Figure 2:
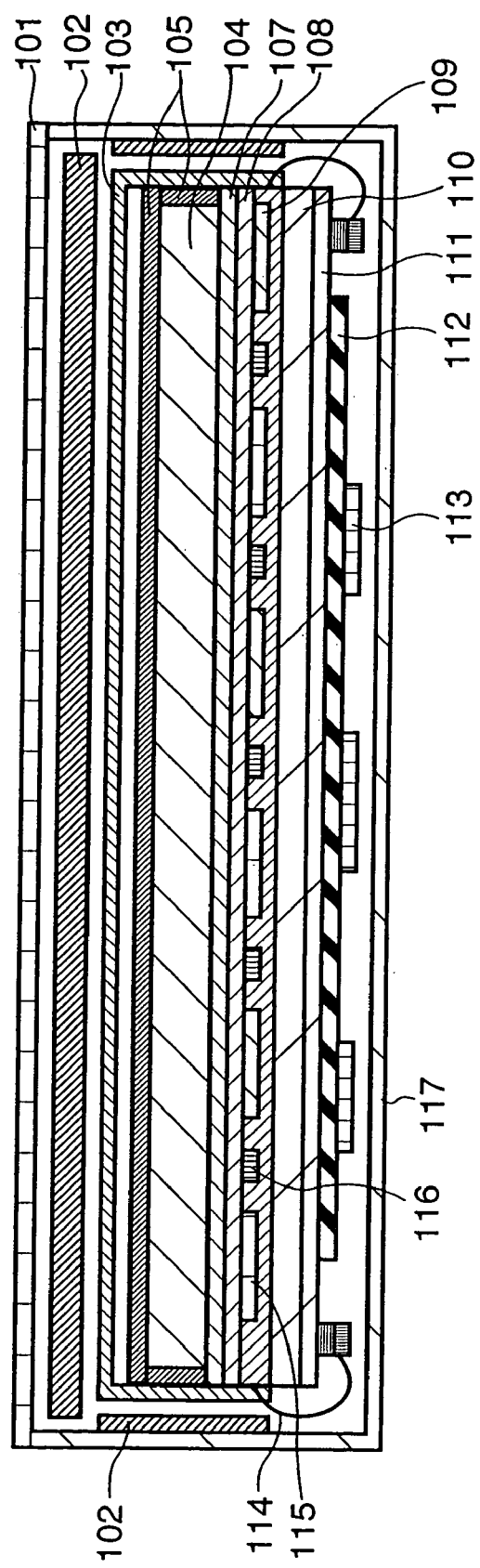
FIG. 2 is a view showing the second preferred embodiment of the present invention.

In FIG. 2, to protect the columnar crystal phosphor 104 directly deposited on the photoelectric conversion devices 109, a highly-rigid member 103 is placed above the columnar crystal phosphor 104, so that the columnar crystal phosphor 104 is protected from an external pressure.

The first and second embodiments are different from each other in formation of the phosphor. When an indirect X-ray area sensor is to be manufactured in which X-rays are converted into light by a phosphor and the light is converted into charges by photoelectric conversion devices, two methods are available for formation of the phosphor.

According to one method, a phosphor is directly deposited or applied to a sensor. According to the other method, a phosphor is formed on a substrate different from a sensor, and the substrate is adhered to the sensor through an adhesive. FIG. 8 shows the relationship among the respective formation methods and that of this specification. As shown in FIG. 8, an embodiment according to the former phosphor formation method corresponds to the second, fourth, and sixth embodiments, and an embodiment according to the latter phosphor formation method corresponds to the first, third, and fifth embodiments. According to the arrangement of a preferred embodiment of the present invention, with either phosphor formation method, a radiographic apparatus can be provided in which the columnar crystal phosphor is protected from an external force and which has a low profile.

The advantages and disadvantages of the two adhesion schemes and which scheme is more preferable will be described. When an indirect type X-ray area sensor is to be manufactured by adhesion after the latter formation method, the risks can be dispersed, so that the yield can be increased. When depositing the columnar crystal phosphor 104, it can be formed without considering the degradation of the photoelectric conversion devices 109 and the like, so that a more ideal columnar structure can be obtained. Therefore, currently, the indirect type X-ray area sensor is most popular as a manufacturing method, which is more preferable. The former formation method of depositing the columnar crystal phosphor 104 directly on the sensor, however, is advantageous in that it does not need an adhesion step. Therefore, the embodiment of the present invention is not limited to that manufactured by the latter manufacturing method, and can also be practiced in the second embodiment which employs the former manufacturing method.

As described above, also in the directly deposited columnar crystal phosphor as shown in FIG. 2, if a highly rigid member is arranged between the phosphor and the surface of the case, a structure can be realized in which an external force is dispersed by a stress dispersing portion and does not reach the columnar crystal phosphor, as in the radiographic apparatus which uses a highly rigid member as the indirectly deposited substrate shown in the first embodiment.

(Third Embodiment)

Figure 3:
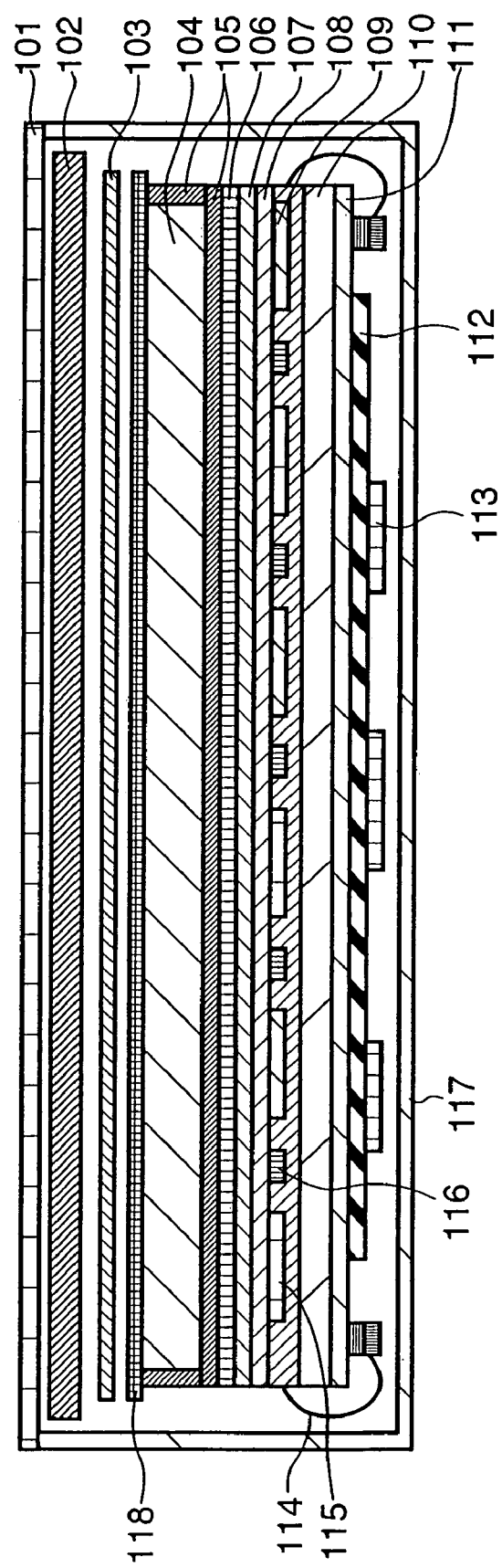
FIG. 3 is a view showing the third preferred embodiment of the present invention.

The third preferred embodiment of the present invention will be described with reference to FIG. 3.

The third embodiment is different from the first embodiment in two respects. According to the first difference, a highly rigid member 103 is not arranged on the side of a columnar crystal phosphor 104. As the side surfaces of the columnar crystal phosphor 104 have short sides, an external force does not act on the side surfaces often. In packaging a cassette type radiographic apparatus, there is a demand for a smaller weight. In view of the above facts, an impact from the side surface is not considered in the design. According to the second difference, the highly rigid member 103 is placed above a deposition substrate plate 118. Of the specifications required for a highly rigid member, the specification that the heat resistance and thermal expansion coefficient should be almost equal to those of glass is not satisfied. Thus, when, e.g., a material which is more appropriate than amorphous carbon in terms of the above requirements is developed as the deposition substrate for the columnar crystal phosphor 104, the number of choices for the material increases.

Regarding the stress per unit area as shown in FIG. 12, the third embodiment is not largely different from that first embodiment. Regarding the stress in the transverse direction, according to the structure of third embodiment, not much stress is transmitted to the columnar crystal phosphor 104. Also, in the columnar crystal phosphor 104, a stress from a direction perpendicular to the column has a larger fracture limit stress than the stress from a direction parallel to the column does, and accordingly the structure of the columnar crystal phosphor 104 is not likely to pose a problem. Hence, in the third and fourth embodiments, a stress absorbing portion for a stress in the transverse direction is omitted.

In the third embodiment, the arrangement in which the above two respects are changed from those of the first embodiment is not necessarily limited to an arrangement in which both the two respects are changed simultaneously. An arrangement in which any one of the two respects is changed is also incorporated in the scope of this embodiment.

(Fourth Embodiment)

Figure 4:
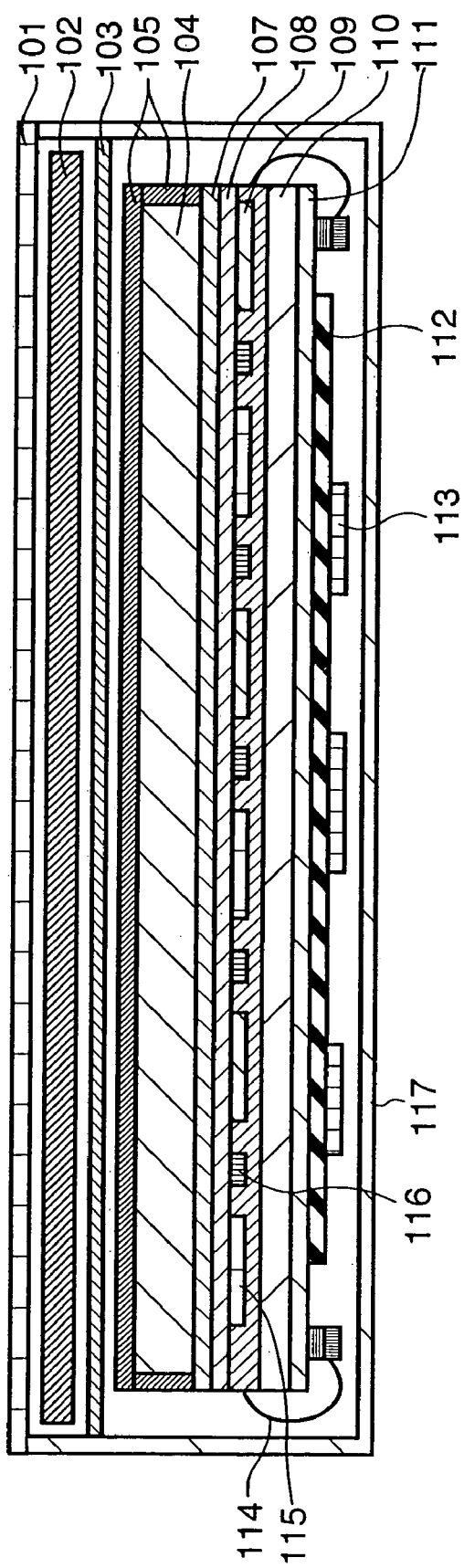
FIG. 4 is a view showing the fourth preferred embodiment of the present invention.

The fourth preferred embodiment of the present invention will be described with reference to FIG. 4.

The difference between the fourth and second embodiments is the same as the difference between the third and first embodiments. Namely, to decrease the weight, the highly rigid member 103 on the side of the columnar crystal phosphor 104 is removed. In the fourth embodiment, unlike the third embodiment, the columnar crystal phosphor 104 is directly deposited on photoelectric conversion devices 109 through first and second protection layers 107 and 108. As the highly rigid member 103 and columnar crystal phosphor 104 are separate, thermal expansion or the like does not influence the columnar crystal phosphor 104 greatly, which is advantageous.

Regarding the stress per unit area as shown in FIG. 12, the fourth embodiment is not much different from the first or second embodiment. Regarding the stress in the transverse direction, according to the structure of the fourth embodiment, the stress is not much transmitted to the columnar crystal phosphor. This is the same as in the third embodiment.

(Fifth Embodiment)

Figure 5:
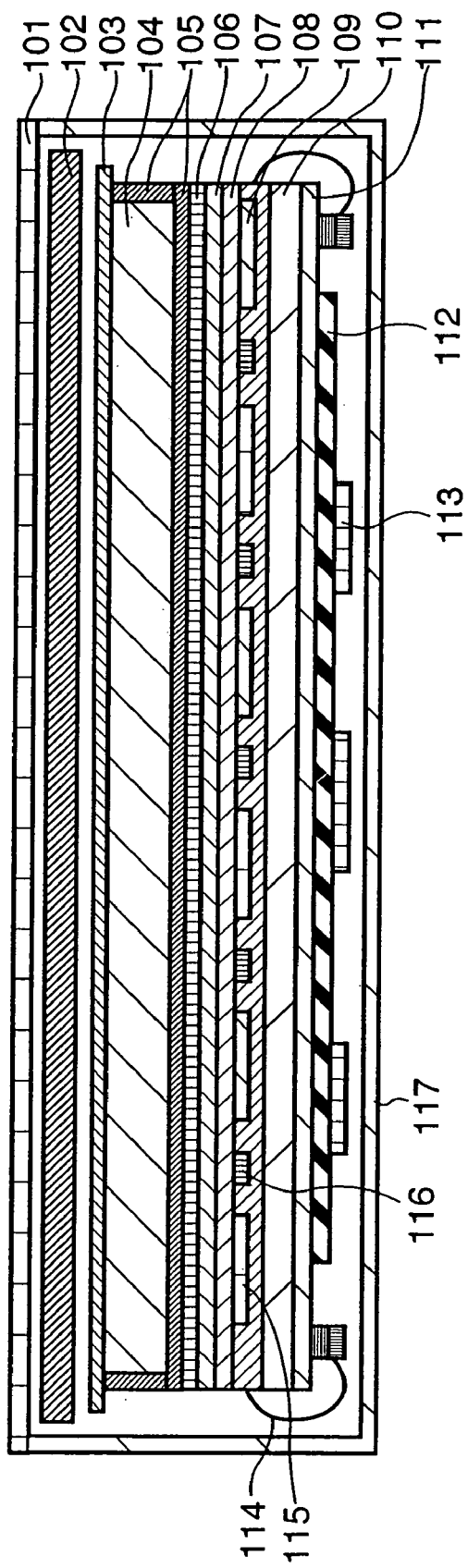
FIG. 5 is a view showing the fifth preferred embodiment of the present invention.

The fifth embodiment will be described with reference to FIG. 5.

According to the characteristic feature of the fifth embodiment, a columnar crystal phosphor 104 is directly deposited on a highly rigid member 103. The advantages of the arrangement in which the columnar crystal phosphor 104 is directly deposited on the highly rigid member 103 are as follows. The number of components in a space defined by a case lid 101 and case main body 117 with respect to the surface of the columnar crystal phosphor 104 decreases. This is advantageous in terms of the X-ray transmittance and the noise caused by the structure of a front-surface component. The arrangement of the fifth embodiment is different from that of the third embodiment in that the highly rigid member 103 is a substrate to be deposited on the columnar crystal phosphor 104. The process of dispersion of the stress per unit area upon application of an external force is not largely different from that of FIG. 12.

(Sixth Embodiment)

Figure 6:
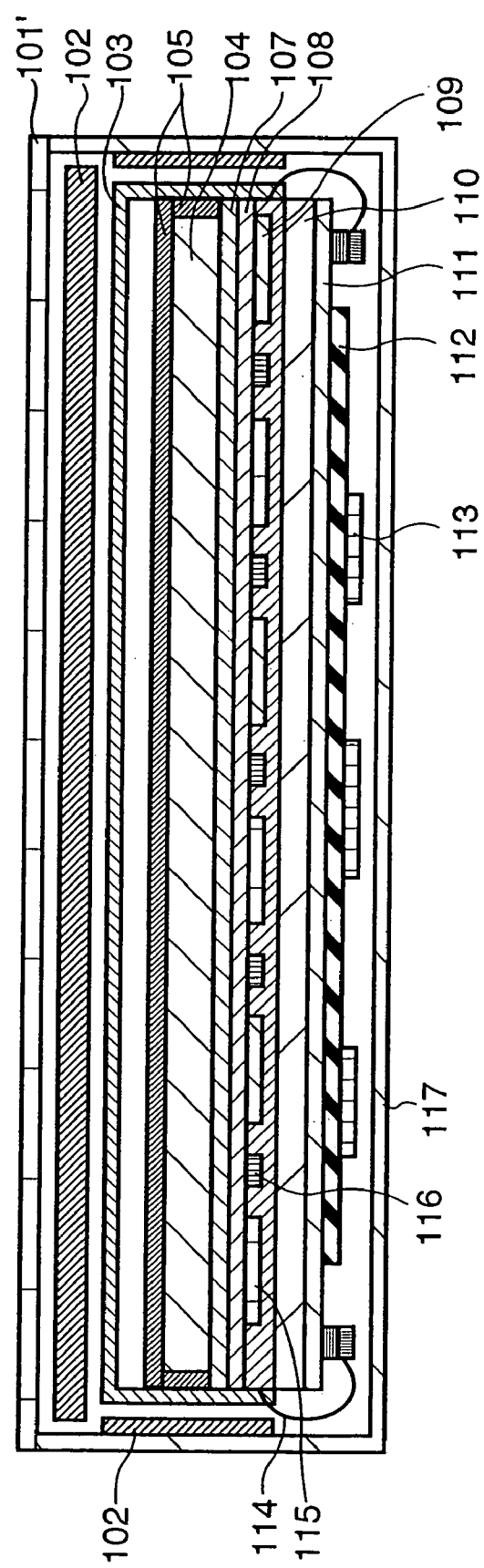
FIG. 6 is a view showing the sixth preferred embodiment of the present invention.

The sixth preferred embodiment of the present invention will be described with reference to FIG. 6.

The sixth embodiment shows a case wherein a highly rigid member is used as a case lid 101'. Even when a highly rigid member is adopted as the case lid 101', as the material of the highly rigid member, it is desirable to use amorphous carbon which has a high X-ray transmittance and high rigidity, in the same manner as described above. In the sixth embodiment, a columnar crystal phosphor (CsI) 104 is directly deposited on photoelectric conversion devices 109 through first and second protection layers 107 and 108.

Even when the highly rigid member is used as the case lid 101', a cassette type radiographic apparatus has limitations in terms of weight and X-ray transmittance. In terms of rigidity against the X-ray transmittance, it is desirable to add another highly rigid member 103 between the columnar crystal phosphor 104 and the case lid 101' which uses the highly rigid member.

FIG. 15 shows the idea of stress dispersion in a case wherein the highly rigid member is used as the case lid 101' in comparison with the prior art of FIG. 13. The detailed description on FIGS. 13 and 15 is the same as that described in the first embodiment.

(Seventh Embodiment)

Figure 7:
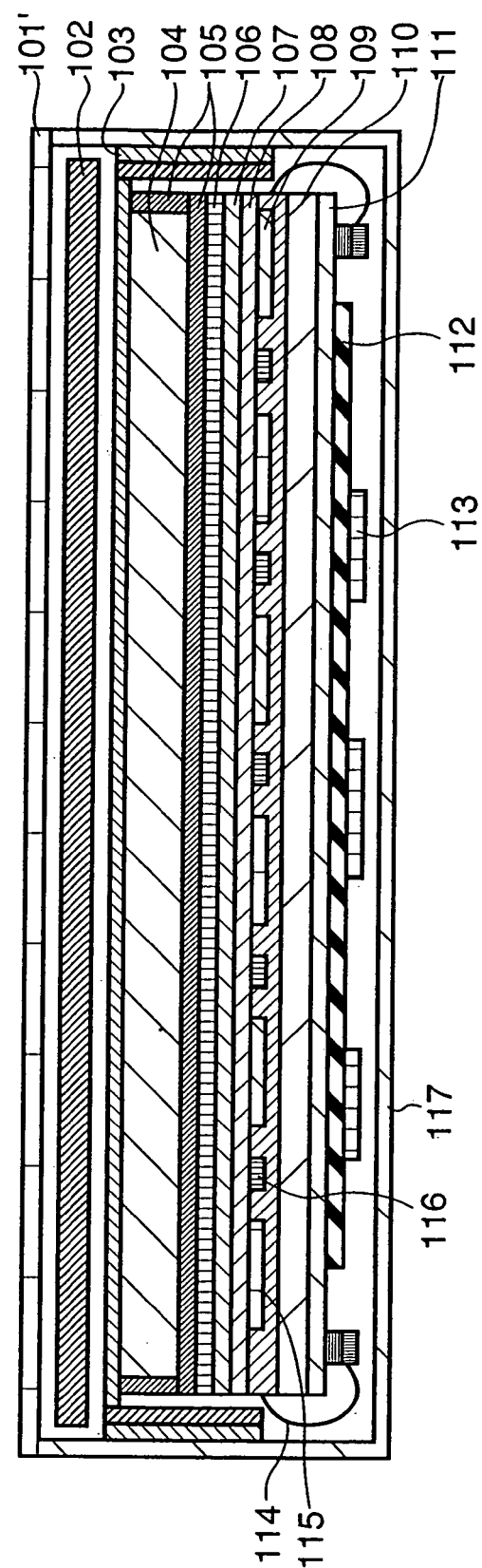
FIG. 7 is a view showing the seventh preferred embodiment of the present invention.
Figure 9:
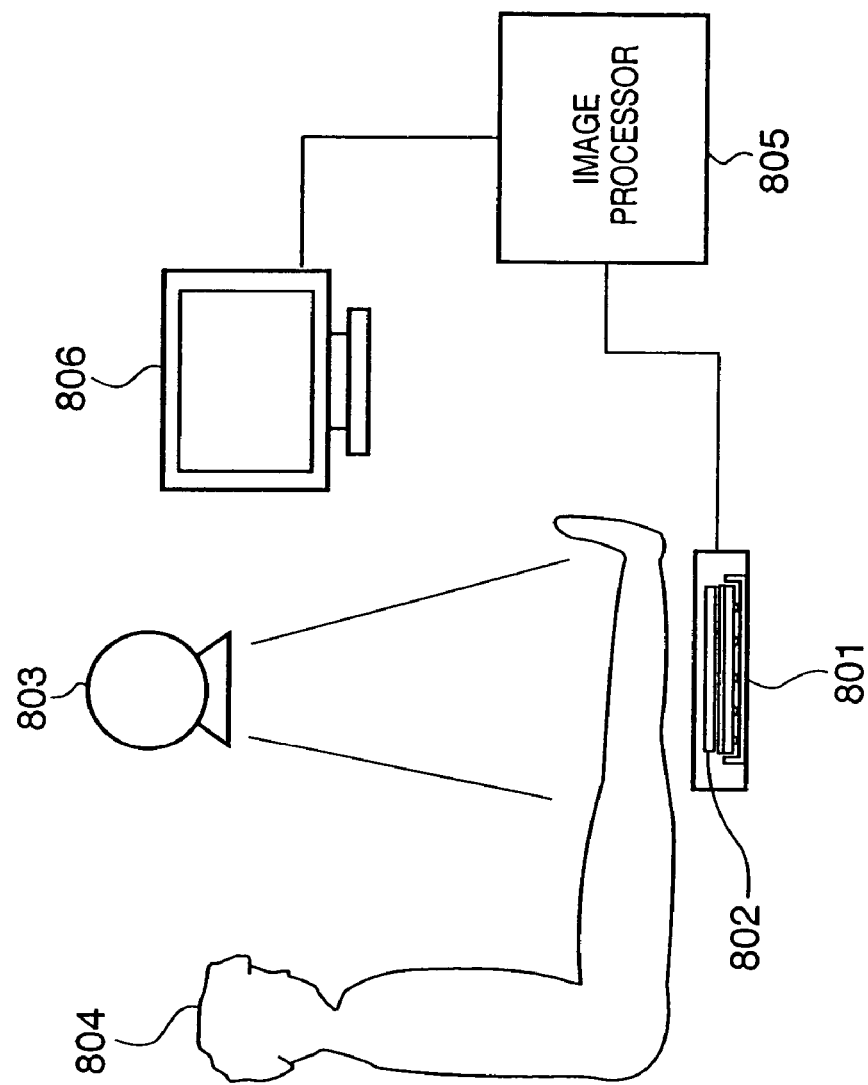
FIG. 9 is a view showing the structure of a system which includes a conventional cassette type radiographic apparatus.
Figure 10:
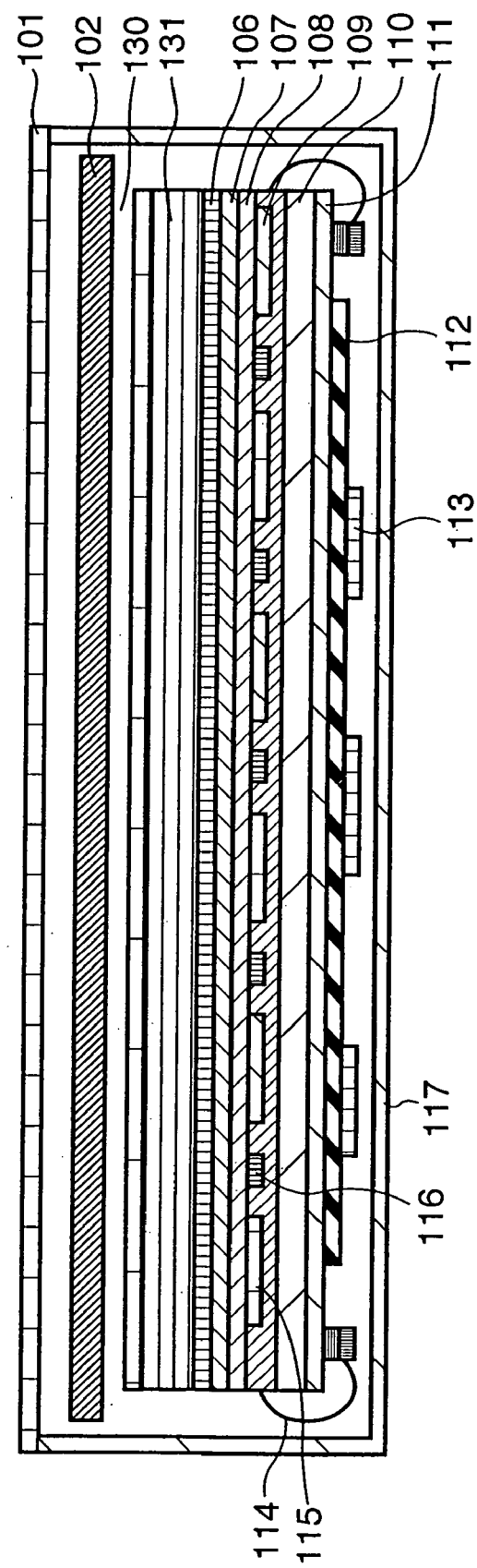
FIG. 10 is a view showing the conventional cassette type radiographic apparatus.
Figure 11A:
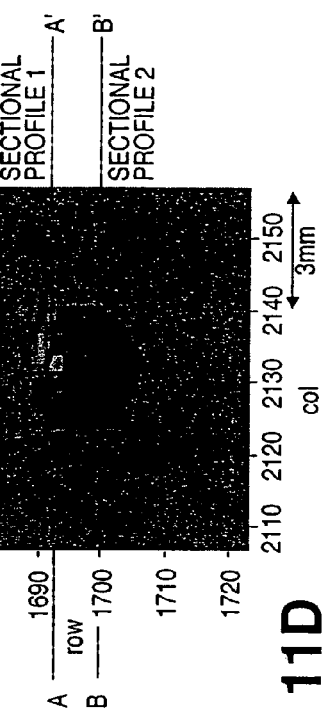
FIGS. 11A to 11D are views and graphs which show an example of an image after a columnar crystal phosphor is fractured by an external pressure.
Figure 11B:
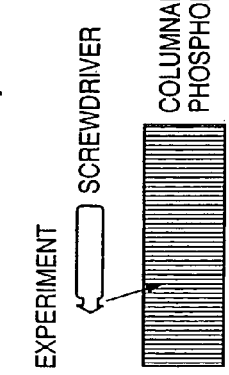
Figure 11D:
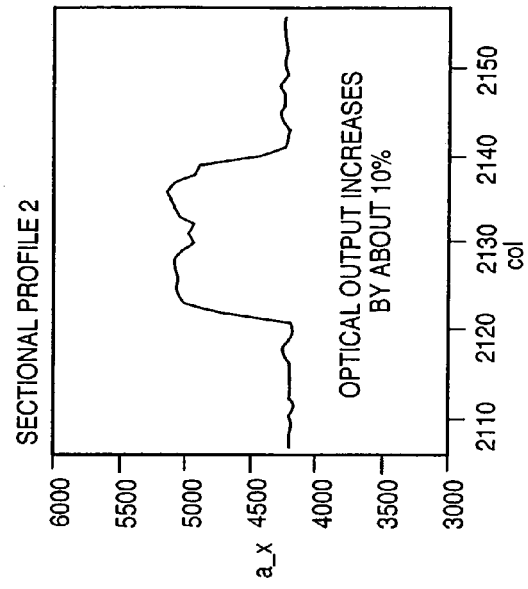
Figure 11C:
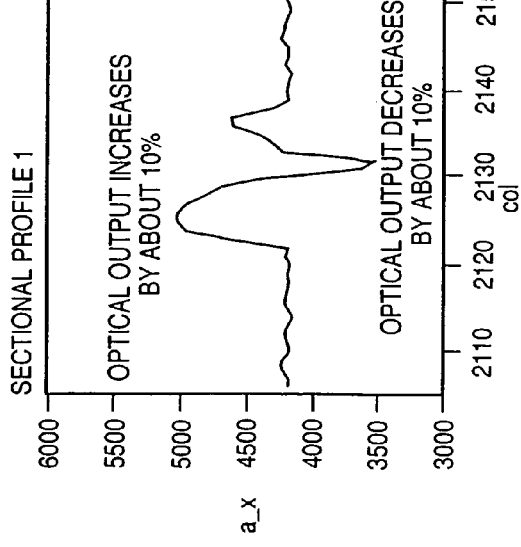

The seventh preferred embodiment of the present invention will be described with reference to FIG. 7.

The seventh embodiment also shows a case wherein a highly rigid member is used as a case lid 101' in the same manner as in the sixth embodiment. As the material of the highly rigid member, it is desirable to use amorphous carbon which has a high X-ray transmittance and high rigidity as described above, in the same manner as in the sixth embodiment.

In the same manner as in the sixth embodiment, in terms of rigidity against the X-ray transmittance, it is desirable to add another highly rigid member 103 between a columnar crystal phosphor 104 and the case lid 101' which uses the highly rigid member.

(Other Embodiment)

Another preferred embodiment of the present invention will be described. In this arrangement, no buffer member 102 is used as a relaxation portion which relaxes a force from outside the case. Although not shown, the arrangement of this embodiment can be applied to any one of the first to seventh embodiments described above. More specifically, the above first to seventh embodiments can employ an arrangement in which the buffer member 102 is eliminated and a gap is provided there to serve as a relaxation portion which relaxes a force from outside the case. If no gap is provided at the position of the buffer member 102, when a case lid 101 deforms, it may abut against a highly rigid member 103. When the arrangement according to this embodiment is employed, for example, the width of the gap can be increased to be larger than the maximal deformation limit of the case lid 101. Thus, the case lid 101 is prevented from abutting against the highly rigid member 103, and an external force from the case lid 101 can be prevented from acting on a columnar crystal phosphor 104.

(Application)

A cassette type radiographic apparatus 801 according to a preferred embodiment of the present invention can be used with the same arrangement as it is applied to a universal arm, C-arm, cassette holder, or the like as a frame in a head radiographic apparatus (FIG. 18A), Bucky standing-position radiographic stand (FIG. 18B), Bucky table (with elevatable top plate) (FIG. 18C), or U-arm-type Bucky radiographic apparatus (FIG. 18D).

In this specification, a cassette type radiographic apparatus which uses an FPD refers to a radiographic apparatus having a weight of 10 kg or less and a thickness of 20 cm or less. According to an image forming method for the radiographic apparatus, a columnar crystal phosphor, and photoelectric conversion devices which uses semiconductor are used. As such a semiconductor, amorphous silicon is desirably used, and a CMOS sensor or CCD imaging devices can also be used. In this case, as the material of photoelectric conversion devices 109, for example, crystal silicon can be used.

Having described the preferred embodiments of the present invention, the present invention is not limited to these embodiments, and various changes and modifications can be made within the scope not departing from the spirit of the present invention.

As has been described above, according to the present invention, in a cassette type radiographic apparatus which uses a columnar crystal phosphor, a stress acting on the columnar crystal phosphor is decreased, so that a low-profile, lightweight cassette type radiographic apparatus can be implemented.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-239794 filed on Aug. 19, 2004, which is hereby incorporated by reference herein.

What is claimed is:

1. A cassette type radiographic apparatus comprising:
a columnar crystal phosphor which converts X-rays into visible light;
a photodetector which converts the visible light into an electrical signal; and
a case which houses said columnar crystal phosphor and said photodetector,
wherein a rigid member which has higher rigidity than that of said columnar crystal phosphor is arranged between a surface of said case where the X-rays enter and columnar crystal phosphor.

2. The apparatus according to claim 1, further comprising a relaxation portion arranged between said columnar crystal phosphor and said surface of said case where the X-rays enter.

3. The apparatus according to claim 2, wherein said relaxation portion and rigid member are arranged between said columnar crystal phosphor and a surface that surrounds a side portion of said columnar crystal phosphor.

4. The apparatus according to claim 2, wherein said relaxation portion comprises a buffer member.

5. The apparatus according to claim 4, wherein said buffer member comprises a sheet-type member made of one of rubber and gel.

6. The apparatus according to claim 4, wherein said buffer member comprises one of a silicone- and urethane-based foamed members.

7. The apparatus according to claim 2, wherein said relaxation portion comprises a gap.

8. The apparatus according to claim 1, wherein said columnar crystal phosphor is deposited on said rigid member.

9. The apparatus according to claim 1, wherein said case is formed of a rigid member having higher rigidity than that of said columnar crystal phosphor.

10. The apparatus according to claim 1, wherein said rigid member comprises a plate-like member made of one of amorphous carbon and glass.

11. The apparatus according to claim 1, wherein said columnar crystal phosphor comprises CsI.

* * * * *

UNITED STATES PATENT AND TRADEMARK OFFICE
CERTIFICATE OF CORRECTION

PATENT NO. : 7,164,137 B2
APPLICATION NO. : 11/203494
DATED : January 16, 2007
INVENTOR(S) : Shinsuke Hayashida It is certified that error appears in the above-identified patent and that said Letters Patent is hereby corrected as shown below:

Column 3, line 35, delete " In " and insert -- in --

Column 11, line 7, delete " $\delta\sigma$ " and insert -- $\delta_c$ --

Signed and Sealed this

Twenty-eighth Day of August, 2007

JON W. DUDAS
*Director of the United States Patent and Trademark Office*